US00RE49864E

(19) United States
(12) Reissued Patent
Razak et al.

(10) Patent Number: US RE49,864 E
(45) Date of Reissued Patent: Mar. 5, 2024

(54) AUTOMATED ALARM PANEL CLASSIFICATION USING PARETO OPTIMIZATION

(71) Applicant: Johnson Controls Tyco IP Holdings LLP, Milwaukee, WI (US)

(72) Inventors: Abdul Razak, Cork (IE); Gopi Subramanian, Boca Raton, FL (US); Michael C. Stewart, Deerfield Beach, FL (US)

(73) Assignee: JOHNSON CONTROLS TYCO IP HOLDINGS LLP, Milwaukee, WI (US)

(21) Appl. No.: 17/680,092

(22) Filed: Feb. 24, 2022

Related U.S. Patent Documents

Reissue of:
(64) Patent No.: 10,573,168
Issued: Feb. 25, 2020
Appl. No.: 16/172,371
Filed: Oct. 26, 2018

(51) Int. Cl.
*G08B 19/00* (2006.01)
*G06F 17/18* (2006.01)
*G08B 25/00* (2006.01)
*G08B 29/18* (2006.01)

(52) U.S. Cl.
CPC ..... *G08B 29/185* (2013.01); *G06F 17/18* (2013.01); *G08B 19/00* (2013.01); *G08B 25/007* (2013.01)

(58) Field of Classification Search
CPC .... G08B 29/185; G08B 19/00; G08B 25/007; G06F 17/18
See application file for complete search history.

(56) References Cited

U.S. PATENT DOCUMENTS

2003/0083756 A1* 5/2003 Hsiung ..... G05B 15/02 700/28
2010/0109860 A1* 5/2010 Williamson ..... G08B 29/16 340/508
2014/0055274 A1* 2/2014 Hatch ..... G01H 1/00 340/679
2016/0071405 A1* 3/2016 Hayek ..... G08B 1/08 340/509
2016/0234232 A1* 8/2016 Poder et al.
2017/0213447 A1* 7/2017 Horrocks ..... G08B 19/00
2019/0102469 A1* 4/2019 Makovsky ..... G06F 11/3072

* cited by examiner

*Primary Examiner* — Mark Sager
(74) *Attorney, Agent, or Firm* — Foley & Lardner LLP

(57) ABSTRACT

Systems and methods for alarm panel analysis include receiving a plurality of alarm events from the respective alarm panels monitoring corresponding buildings. An alarm analysis system may classify the alarm panels by identifying an alarm type for the alarm events. The alarm analysis system may determine a number of occurrences of each alarm type for the alarm panels, and generate a data point for a dataset for the alarm panels. The alarm analysis system may identify statistical dividers in the data points for the data set, which may be used for assigning a ranking for the alarm panels based on their location in relation to the statistical dividers. The alarm analysis system may construct and a monitoring dashboard which includes the rankings of the alarm panels, which may be rendered on a display to an end user.

40 Claims, 10 Drawing Sheets

AUTOMATED ALARM PANEL CLASSIFICATION USING PARETO OPTIMIZATION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATIONS*

*This application is a Reissue of U.S. Pat. No. 10,573,168 (previously U.S. patent application Ser. No. 16/172,371, filed Oct. 26, 2018).*

BACKGROUND

The present disclosure relates generally to building security systems of a building. The present disclosure relates more particularly to systems and methods for analyzing data generated by the building security systems to improve the building security systems.

In a building, various building devices provide security monitoring and fire detection and response. A false alarm can be a serious problem for security or fire systems. In some cases, the majority of the alarms (e.g., approximately 98%) generated by security or fire systems are false alarms. Responding to false alarms creates a heavy financial burden on customers, police departments, fire departments, and alarm system providers.

False alarms can, in some cases, be attributed to three preventable causes, user error, faulty equipment, and improper equipment installation. Examples of user error may be a user entering an incorrect keypad code into an alarm system, a user leaving a door or window open, or a user leaving objects near motion detectors. In some cases, the equipment itself is faulty. For example, the equipment may be reaching an end of life state and equipment parts may be wearing out or breaking. Regarding improper installation, motion detectors may not be installed in proper areas or placed at the proper heights.

SUMMARY

According to one embodiment, the present disclosure is directed to a system for analyzing alarm panels. The system includes a communications interface communicably coupled to alarm panels at respective buildings. The communications interface is configured to receive alarm events from the alarm panels. The alarm events indicate an alarm type. The system includes a processing circuit configured to receive, via the communications interface, alarm events from the respective alarm panels. The processing circuit is further configured to classify each of the alarm panels according to the alarm events. Classifying each of the alarm panels includes identifying, for each alarm event, an alarm type. Classifying each of the alarm panels includes determining, for each alarm panel, a number of occurrences of each alarm type. Classifying each of the alarm panels includes generating, for each alarm panel, a data point for a dataset. The data point represents the number of occurrences of each alarm type for a respective alarm panel. Classifying each of the alarm panels includes identifying, for the dataset, statistical dividers in the data points. The statistical dividers define a separation of rankings for the data points within the dataset. Classifying each of the alarm panels includes assigning a ranking for each of the alarm panels based on their respective location in relation to the statistical dividers. The processing circuit is further configured to construct a monitoring dashboard which includes the ranking of each of the alarm panels according to the classification of the alarm panels. The processing circuit is further configured to cause the monitoring dashboard to be rendered on a display to an end user. The monitoring dashboard indicates the ranking of the alarm panels for servicing the alarm panels by the end user.

In some embodiments, the statistical dividers are parallel and equidistant from one another.

In some embodiments, identifying the statistical dividers in the data points includes applying a filter to the data points of the dataset which removes zeros and outliers. Identifying the statistical dividers in the data points may further include compute an upper Pareto frontier within the dataset. Identifying the statistical dividers in the data points may further include compute a lower Pareto frontier within the dataset. Identifying the statistical dividers in the data points may further include compute an upper centroid for the upper Pareto frontier, a lower centroid for the lower Pareto frontier, and a midpoint for the upper centroid and lower centroid. Identifying the statistical dividers in the data points may further include define the statistical dividers including an upper statistical divider, a lower statistical divider, and a middle statistical divider in relation to at least one of the upper centroid, lower centroid, and midpoint.

In some embodiments, computing the upper centroid, the lower centroid, and the midpoint includes computing the upper centroid, $C_{UPF}$, for the upper Pareto frontier. Computing the upper centroid, the lower centroid, and the midpoint may further include computing the lower centroid, $C_{LPF}$, for the lower Pareto frontier. Computing the upper centroid, the lower centroid, and the midpoint may further include computing the midpoint, $C_{MPF}$, between the upper centroid and lower centroid according to $C_{MPF}=(C_{UPF}+C_{LPF})/2$.

In some embodiments, identifying the statistical dividers includes selecting a value, $\alpha$, between 0 and 1 which defines a spacing between the statistical dividers. Identifying the statistical dividers may further include defining an upper statistical divider centroid, $C_{VH}$, as $C_{VH}=(1+2\alpha)C_{MPF}$. Identifying the statistical dividers may further include defining a lower statistical divider centroid, $C_{VL}$, as $C_{VL}=(1-2\alpha)C_{MPF}$. Identifying the statistical dividers may further include defining the middle statistical divider which bisects the midpoint. Identifying the statistical dividers may further include defining the upper statistical divider and lower statistical divider as extending through the upper statistical divider centroid and lower statistical centroid and extending parallel to the middle statistical divider.

In some embodiments, identifying the statistical dividers may further include defining a middle upper statistical divider centroid, $C_H$, as $C_H=(1+\alpha)C_{MPF}$, and defining a middle lower statistical divider centroid, $C_L$, as $C_L=(1-\alpha)C_{MPF}$.

In some embodiments, assigning the ranking includes determining, for each data point in the dataset D, a relative location to the upper statistical divider, upper middle statistical divider, middle statistical divider, lower middle statistical divider, and lower statistical divider. Assigning the ranking may further include assigning a ranking of very high, high, middle, low, and very low to each data point according to the relative location.

In some embodiments, identifying the statistical dividers in the data points includes applying a filter to the data points of the dataset which removes zeros and outliers to generate a filtered dataset D. Identifying the statistical points may further include computing an upper Pareto frontier ($UPF_D$) for the filtered dataset D. Identifying the statistical points may further include selecting a value, $\alpha$, between 0 and 0.25 which defines a spacing between the statistical dividers. Identifying the statistical points may further include computing a plurality of lower Pareto frontiers including a very high Pareto frontier ($UPF_{VH}$), a high Pareto frontier ($UPF_H$), a middle Pareto frontier ($UPF_M$), a low Pareto frontier ($UPF_L$), and a very low Pareto frontier ($UPF_{VL}$) according to $UPF_{VH}=UPF_D$, $UPF_H=(1-\alpha)UPF_D$, $UPF_M=(1-2\alpha)UPF_D$, $UPF_L=(1-3\alpha)UPF_D$, and $UPF_{VL}=(1-4\alpha)UPF_D$. In some embodiments, the upper statistical divider is $UPF_{VH}$, the lower statistical divider is $UPF_{VL}$, the middle statistical divider is $UPF_M$, and wherein define the statistical dividers further include an upper middle statistical divider $UPF_H$ and a lower middle statistical divider $UPF_L$.

In some embodiments, assigning the ranking includes determining, for each data point in the dataset D, a relative location to the upper statistical divider, upper middle statistical divider, middle statistical divider, lower middle statistical divider, and lower statistical divider. Assigning the ranking may further include assigning a ranking of very high, high, middle, low, and very low to each data point according to the relative location.

In some embodiments, assigning the ranking includes determining, for each at a point in the dataset D, which statistical divider a data point is located between from the upper statistical divider, upper middle statistical divider, middle statistical divider, lower middle statistical divider, and lower statistical divider. Assigning the ranking may further include assigning a ranking of very high, high, middle, low, and very low to the data point based on which statistical divider the data point is located between.

According to another implementation, the present disclosure is directed to a method for analyzing alarm panels. The method includes receiving, via a communications interface communicably coupled to alarm panels at respective buildings, alarm events from the respective alarm panels. The communications interface is configured to receive alarm events from the alarm panels. The alarm events indicate an alarm type. The method includes classifying the alarm panels according to the plurality of alarm events. Classifying the alarm panels includes identifying, for each alarm event, an alarm type. Classifying the alarm panels includes determining, for each alarm panel, a number of occurrences of each alarm type. Classifying the alarm panels includes generating, for each alarm panel, a data point for a dataset. The data point represents the number of occurrences of each alarm type for a respective alarm panel. Classifying the alarm panels includes identifying, for the dataset, statistical dividers in the data points. The statistical dividers define a separation of rankings for the data points within the dataset. Classifying the alarm panels includes assigning a ranking for each of the alarm panels based on their respective location in relation to the statistical dividers. The method includes constructing a monitoring dashboard which includes the ranking of each of the alarm panels according to the classification of the alarm panels. The method includes causing the monitoring dashboard to be rendered on a display to an end user. The monitoring dashboard indicates the ranking of the alarm panels for servicing the alarm panels by the end user.

In some embodiments, the statistical dividers are parallel and equidistant from one another.

In some embodiments, identifying statistical dividers in the data points includes applying a filter to the data points of the dataset which removes zeros and outliers. Identifying the statistical dividers may further include computing an upper Pareto frontier within the dataset. Identifying the statistical dividers may further include computing a lower Pareto frontier within the dataset. Identifying the statistical dividers may further include computing an upper centroid for the upper Pareto frontier, a lower centroid for the lower Pareto frontier, and a midpoint for the upper centroid and lower centroid. Identifying the statistical dividers may further include defining the statistical dividers including an upper statistical divider, a lower statistical divider, and a middle statistical divider in relation to at least one of the upper centroid, lower centroid, and midpoint.

In some embodiments, computing the upper centroid, the lower centroid, and the midpoint includes computing the upper centroid, $C_{UPF}$, for the upper Pareto frontier. Computing the upper centroid, the lower centroid, and the midpoint may further include computing the lower centroid, $C_{LPF}$, for the lower Pareto frontier. Computing the upper centroid, the lower centroid, and the midpoint may further include computing the midpoint, $C_{MPF}$, between the upper centroid and lower centroid according to $C_{MDF}=(C_{UPF}+C_{LPF})/2$.

In some embodiments, identifying the statistical dividers includes selecting a value, $\alpha$, between 0 and 1 which defines a spacing between the statistical dividers. Identifying the statistical dividers may further include defining an upper statistical divider centroid, $C_{VH}$, as $C_{VH}=(1+2\alpha)C_{MPF}$. Identifying the statistical dividers may further include defining a middle upper statistical divider centroid, $C_H$, as $C_H=(1+\alpha)C_{MPF}$. Identifying the statistical dividers may further include defining a middle lower statistical divider centroid, $C_L$, as $C_L=(1-\alpha)C_{MPF}$. Identifying the statistical dividers may further include defining a lower statistical divider centroid, $C_{VL}$, as $C_{VL}=(1-2\alpha)C_{MPF}$. Identifying the statistical dividers may further include defining the middle statistical divider, which bisects the midpoint. Identifying the statistical dividers may further include defining the upper statistical divider, a middle upper statistical divider, a middle lower statistical divider, and the lower statistical divider, which extend through the upper statistical divider centroid, the middle upper statistical divider centroid, the middle lower statistical divider centroid, and the lower statistical divider centroid, and parallel to the middle statistical divider.

In some embodiments, assigning the ranking includes determining, for each data point in the dataset D, a relative location to the upper statistical divider, upper middle statistical divider, middle statistical divider, lower middle statistical divider, and lower statistical divider, each data point. Assigning the ranking may further include assigning a ranking of very high, high, middle, low, and very low to each data point according to the relative location.

In some embodiments, identifying the statistical dividers in the data points includes applying a filter to the data points of the dataset which removes zeros and outliers to generate a filtered dataset D. Identifying the statistical dividers may further include computing an upper Pareto frontier ($UPF_D$) for the filtered dataset D. Identifying the statistical dividers may further include selecting a value, $\alpha$, between 0 and 0.25 which defines a spacing between the statistical dividers.

Identifying the statistical dividers may further include computing a plurality of lower Pareto frontiers including a very high Pareto frontier ($UPF_{VH}$), a high Pareto frontier ($UPF_H$), a middle Pareto frontier ($UPF_M$), a low Pareto frontier ($UPF_L$), and a very low Pareto frontier ($UPF_{VL}$) according to $UPF_{VH}=UPF_D$, $UPF_H=(1-\alpha)UPF_D$, $UPF_M=(1-2\alpha)UPF_D$, $UPF_L=(1-3\alpha)UPF_D$, and $UPF_{VL}=(1-4\alpha)UPF_D$. In some embodiments, the upper statistical divider is $UPF_{VH}$, the lower statistical divider is $UPF_{VL}$, the middle statistical divider is $UPF_M$, and wherein fine the statistical dividers further include an upper middle statistical divider $UPF_H$ and a lower middle statistical divider $UPF_L$.

In some embodiments, assigning the ranking includes determining, for each data point in the dataset D, a relative location to the upper statistical divider, upper middle statistical divider, middle statistical divider, lower middle statistical divider, and lower statistical divider. Assigning the ranking may further include assigning a ranking of very high, high, middle, low, and very low to each data point according to the relative location.

In some embodiments, assigning the ranking includes determining, for each data point in the dataset D, which statistical divider a data point is located between from the upper statistical divider, upper middle statistical divider, middle statistical divider, lower middle statistical divider, and lower statistical divider. Assigning the ranking may further include assigning a ranking of very high, high, middle, low, and very low to the data point based on which statistical divider the data point is located between.

According to another implementation, the present disclosure is directed to a computing device for analyzing alarm panels. The computing device includes a processing circuit including a processor and memory. The memory stores instructions that, when executed by the processor, cause the processor to receive, via a communications interface communicably coupled to a plurality of alarm panels at respective buildings, a plurality of alarm events from the respective alarm panels, wherein the communications interface is configured to receive alarm events from the alarm panels, the alarm events indicating an alarm type. The memory further stores instructions to classify each of the alarm panels according to the plurality of alarm events. Classifying each of the alarm panels includes identifying, for each alarm event, an alarm type. Classifying each of the alarm panels includes determining, for each alarm panel, a number of occurrences of each alarm type. Classifying each of the alarm panels includes generating, for each alarm panel, a data point for a dataset. The data point represents the number of occurrences of each alarm type for a respective alarm panel. Classifying each of the alarm panels includes identifying, for the dataset, statistical dividers in the data points. The statistical dividers define a separation of rankings for the data points within the dataset. Classifying each of the alarm panels includes assigning a ranking for each of the alarm panels based on their respective location in relation to the statistical dividers. The memory further stores instructions to construct a monitoring dashboard which includes the ranking of each of the alarm panels according to the classification of the alarm panels. The memory further stores instructions to cause the monitoring dashboard to be rendered on a display to an end user, the monitoring dashboard indicating the ranking of the alarm panels for servicing the alarm panels by the end user.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods are shown for analyzing alarm panels, according to various exemplary embodiments. Many buildings may include an alarm panels, which operate or otherwise provide a security system for the building. The alarm panels may be communicably coupled to various security sensors. The sensors may trigger alarm events when, for instance, security issues occur.

In a large or complex connected security system, where alarms (including false alarms) may be numerous and noisy, it can be difficult for security personnel to identify those alarm panels and their associated devices that may be underperforming or incorrectly configured, or to highlight other causes for concern, such as systemic issues with a panel, or a persistent security threat affecting an area supervised by that panel.

In a connected security system, data about alarms is collected, for example, the type of alarm, time of occurrence, relevant alarm panel, and so on. Identifying alarm panels that have numerous alarm events associated with them is one way for system monitors to highlight possible underlying issues. In larger, more complex systems, however, some of the data may be anomalous, making it more difficult for system personnel to meaningfully assess individual alarm panel performance by reference to patterns in the system as a whole. For example, in considering a set of alarms, a given system may need to identify which alarms and panels need the most attention. Comparing alarm panels may be difficult due to the different types, and occurrence, of alarms.

The present disclosure is generally directed to systems and methods for analysis and diagnosis of alarm panel conditions. The present disclosure uses Pareto optimality approaches in order to rank alarm panels by their performance against that of the alarm system as a whole, using multiple variables.

Pareto optimality typically involves multi-objective optimization. In its application to this disclosure, alarm panels are ranked according to how relatively noisy they are. Connected security systems usually classify alarms by type. Two common examples of alarm types are: Burglary Alarms (BA) and Hold-up or panic alarms (HU)—though many other types of alarms may be used and included in various alarm and security systems. A single system may have many alarm type classifications.

For all alarm panels to be classified, the disclosed systems and methods count the number of alarm types (for example, BU, HU, and so on) occurring on each alarm panel over a similar measurement period. For each alarm type, each alarm panel may be represented in a dimensional space or dataset. Using various Pareto optimality calculations, a number of levels or rankings may be assigned to the alarm panels in terms of noisiness, such as: 'Very High', 'High', 'Medium', 'Low', and 'Very Low.'

Building Management System and HVAC System

Figure 1:
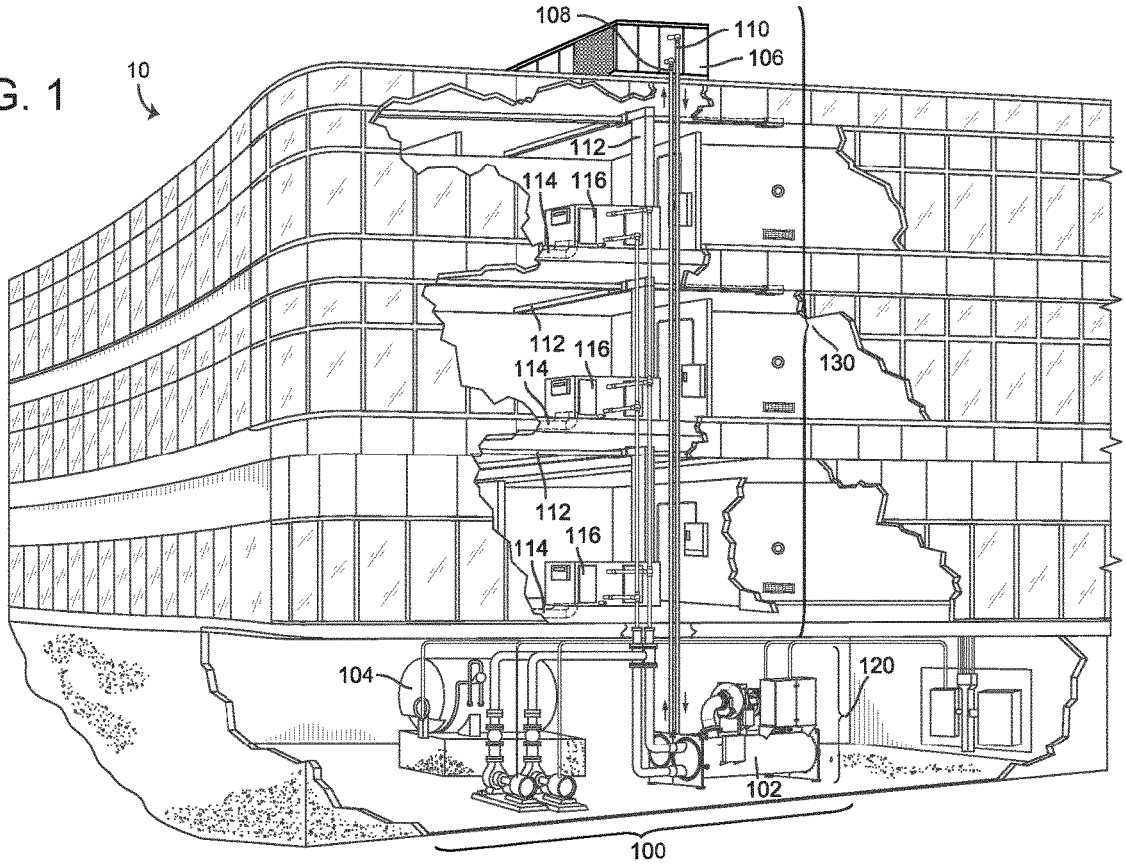
FIG. 1 is a drawing of a building equipped with a HVAC system, according to an exemplary embodiment.

Referring now to FIG. 1, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Figure 2:
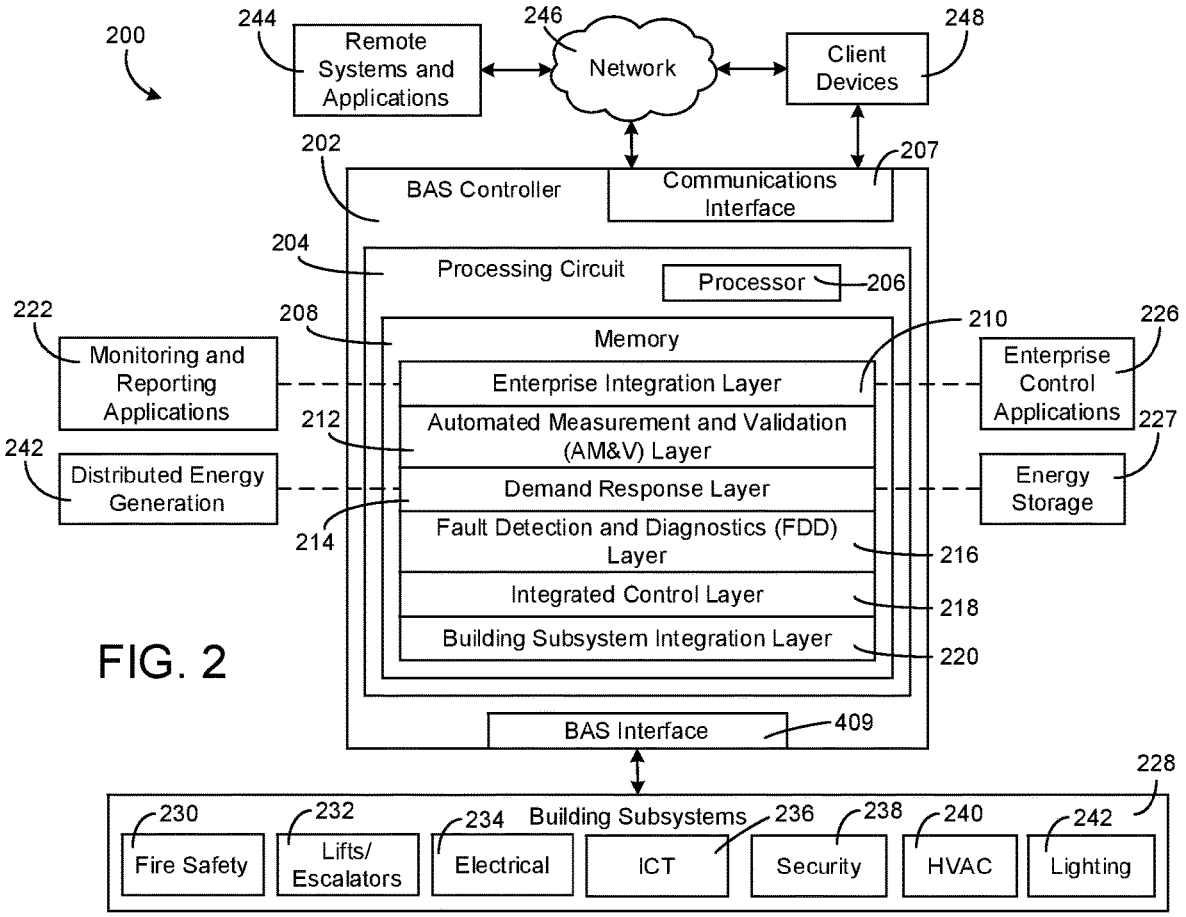
FIG. 2 is a block diagram of a building automation system (BAS) that may be used to monitor and/or control the building of FIG. 1, according to an exemplary embodiment.

Referring now to FIG. 2, a block diagram of a building automation system (BAS) 200 is shown, according to an exemplary embodiment. BAS 200 can be implemented in building 10 to automatically monitor and control various building functions. BAS 200 is shown to include BAS controller 202 and a plurality of building subsystems 228. Building subsystems 228 are shown to include a building electrical subsystem 234, an information communication technology (ICT) subsystem 236, a security subsystem 238, a HVAC subsystem 240, a lighting subsystem 242, a lift/escalators subsystem 232, and a fire safety subsystem 230. In various embodiments, building subsystems 228 can include fewer, additional, or alternative subsystems. For example, building subsystems 228 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 228 include a waterside system and/or an airside system. A waterside system and an airside system are described with further reference to U.S. patent application Ser. No. 15/631,830 filed Jun. 23, 2017, the entirety of which is incorporated by reference herein.

Each of building subsystems 228 can include any number of devices, controllers, and connections for completing its individual functions and control activities. HVAC subsystem 240 can include many of the same components as HVAC system 100, as described with reference to FIG. 1. For example, HVAC subsystem 240 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 242 can include any number of light fixtures, ballasts, lighting sensors, dimmers, or other devices configured to controllably adjust the amount of light provided to a building space. Security subsystem 238 can include occupancy sensors, video surveillance cameras, digital video recorders, video processing servers, intrusion detection devices, access control devices and servers, or other security-related devices.

Still referring to FIG. 2, BAS controller 266 is shown to include a communications interface 207 and a BAS interface 209. Interface 207 can facilitate communications between BAS controller 202 and external applications (e.g., monitoring and reporting applications 222, enterprise control applications 226, remote systems and applications 244, applications residing on client devices 248, etc.) for allowing user control, monitoring, and adjustment to BAS controller 266 and/or subsystems 228. Interface 207 can also facilitate communications between BAS controller 202 and client devices 248. BAS interface 209 can facilitate communications between BAS controller 202 and building subsystems 228 (e.g., HVAC, lighting security, lifts, power distribution, business, etc.).

Interfaces 207, 209 can be or include wired or wireless communications interfaces (e.g., jacks, antennas, transmitters, receivers, transceivers, wire terminals, etc.) for conducting data communications with building subsystems 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In one embodiment, communications interface 207 is a power line communications interface and BAS interface 209 is an Ethernet interface. In other embodiments, both communications interface 207 and BAS interface 209 are Ethernet interfaces or are the same Ethernet interface.

Still referring to FIG. 2, BAS controller 202 is shown to include a processing circuit 204 including a processor 206 and memory 208. Processing circuit 204 can be communicably connected to BAS interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to an exemplary embodiment, memory 208 is communicably connected to processor 206 via processing circuit 402 and includes computer code for executing (e.g., by processing circuit 204 and/or processor 206) one or more processes described herein.

Figure 4:
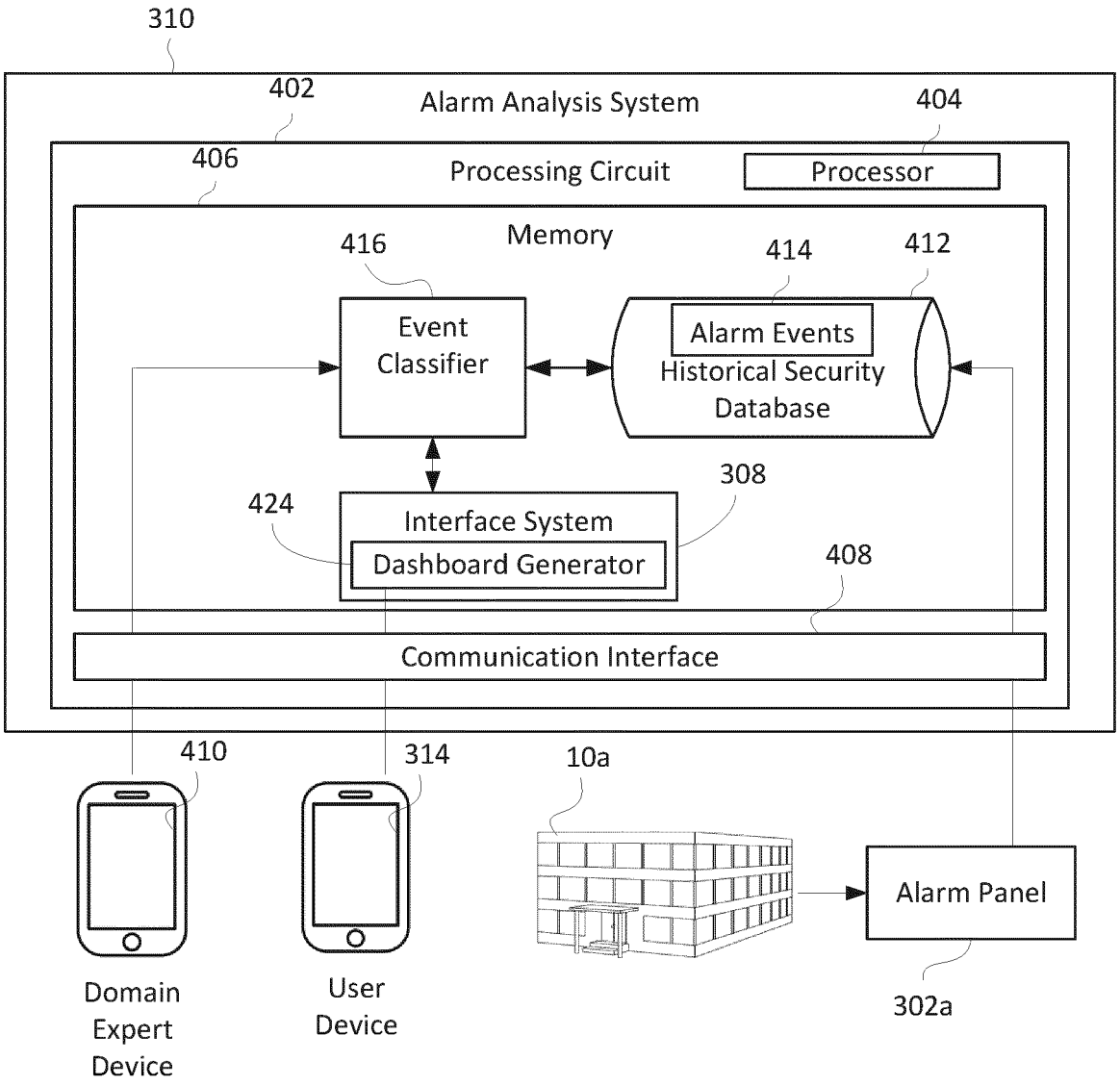
FIG. 4 is a block diagram of a cloud implemented alarm analysis system for analyzing event data to determine false alarm rules, according to an exemplary embodiment.

In some embodiments, BAS controller 202 is implemented within a single computer (e.g., one server, one housing, etc.). In various other embodiments BAS controller 202 can be distributed across multiple servers or computers (e.g., that can exist in distributed locations). Further, while FIG. 4 shows applications 222 and 226 as existing outside of BAS controller 202, in some embodiments, applications 222 and 226 can be hosted within BAS controller 202 (e.g., within memory 208).

Still referring to FIG. 2, memory 208 is shown to include an enterprise integration layer 210, an automated measurement and validation (AM&V) layer 212, a demand response (DR) layer 214, a fault detection and diagnostics (FDD) layer 216, an integrated control layer 218, and a building subsystem integration later 220. Layers 210-220 can be configured to receive inputs from building subsystems 228 and other data sources, determine optimal control actions for building subsystems 228 based on the inputs, generate control signals based on the optimal control actions, and provide the generated control signals to building subsystems 228. The following paragraphs describe some of the general functions performed by each of layers 210-220 in BAS 200.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 can also or alternatively be configured to provide configuration GUIs for configuring BAS controller 202. In yet other embodiments, enterprise control applications 226 can work with layers 210-220 to optimize building performance (e.g., efficiency, energy use, comfort, or safety) based on inputs received at interface 207 and/or BAS interface 209.

Building subsystem integration layer 220 can be configured to manage communications between BAS controller 202 and building subsystems 228. For example, building subsystem integration layer 220 can receive sensor data and input signals from building subsystems 228 and provide output data and control signals to building subsystems 228. Building subsystem integration layer 220 can also be configured to manage communications between building subsystems 228. Building subsystem integration layer 220 translates communications (e.g., sensor data, input signals, output signals, etc.) across a plurality of multi-vendor/multi-protocol systems.

Demand response layer 214 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 224, from energy storage 227, or from other sources. Demand response layer 214 can receive inputs from other layers of BAS controller 202 (e.g., building subsystem integration layer 220, integrated control layer 218, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 214 includes control logic for responding to the data and signals it receives. These responses can include communicating with the control algorithms in integrated control layer 218, changing control strategies, changing setpoints, or activating/deactivating building equipment or subsystems in a controlled manner. Demand response layer 214 can also include control logic configured to determine when to utilize stored energy. For example, demand response layer 214 can determine to begin using energy from energy storage 227 just prior to the beginning of a peak use hour.

In some embodiments, demand response layer 214 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 214 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 214 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 218 can be configured to use the data input or output of building subsystem integration layer 220 and/or demand response later 214 to make control decisions. Due to the subsystem integration provided by building subsystem integration layer 220, integrated control layer 218 can integrate control activities of the subsystems 228 such that the subsystems 228 behave as a single integrated supersystem. In an exemplary embodiment, integrated control layer 218 includes control logic that uses inputs and outputs from a plurality of building subsystems to provide greater comfort and energy savings relative to the comfort and energy savings that separate subsystems could provide alone. For example, integrated control layer 218 can be configured to use an input from a first subsystem to make an energy-saving control decision for a second subsystem. Results of these decisions can be communicated back to building subsystem integration layer 220.

Integrated control layer 218 is shown to be logically below demand response layer 214. Integrated control layer 218 can be configured to enhance the effectiveness of demand response layer 214 by enabling building subsystems 228 and their respective control loops to be controlled in coordination with demand response layer 214. This configuration can reduce disruptive demand response behavior relative to conventional systems. For example, integrated control layer 218 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 218 can be configured to provide feedback to demand response layer 214 so that demand response layer 214 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 218 is also logically below fault detection and diagnostics layer 216 and automated measurement and validation layer 212. Integrated control layer 218 can be configured to provide calculated inputs (e.g., aggregations) to these higher levels based on outputs from more than one building subsystem.

Automated measurement and validation (AM&V) layer 212 can be configured to verify that control strategies commanded by integrated control layer 218 or demand response layer 214 are working properly (e.g., using data aggregated by AM&V layer 212, integrated control layer 218, building subsystem integration layer 220, FDD layer 216, or otherwise). The calculations made by AM&V layer 212 can be based on building system energy models and/or equipment models for individual BAS devices or subsystems. For example, AM&V layer 212 can compare a model-predicted output with an actual output from building subsystems 228 to determine an accuracy of the model.

Fault detection and diagnostics (FDD) layer 216 can be configured to provide on-going fault detection for building subsystems 228, building subsystem devices (i.e., building equipment), and control algorithms used by demand response layer 214 and integrated control layer 218. FDD layer 216 can receive data inputs from integrated control layer 218, directly from one or more building subsystems or devices, or from another data source. FDD layer 216 can automatically diagnose and respond to detected faults. The responses to detected or diagnosed faults can include providing an alarm message to a user, a maintenance scheduling system, or a control algorithm configured to attempt to repair the fault or to work-around the fault.

FDD layer 216 can be configured to output a specific identification of the faulty component or cause of the fault (e.g., loose damper linkage) using detailed subsystem inputs available at building subsystem integration layer 220. In other exemplary embodiments, FDD layer 216 is configured to provide "fault" events to integrated control layer 218 which executes control strategies and policies in response to the received fault events. According to an exemplary embodiment, FDD layer 216 (or a policy executed by an integrated control engine or business rules engine) can shut-down systems or direct control activities around faulty devices or systems to reduce energy waste, extend equipment life, or assure proper control response.

FDD layer 216 can be configured to store or access a variety of different system data stores (or data points for live data). FDD layer 216 can use some content of the data stores to identify faults at the equipment level (e.g., specific chiller, specific AHU, specific terminal unit, etc.) and other content to identify faults at component or subsystem levels. For example, building subsystems 228 can generate temporal (i.e., time-series) data indicating the performance of BAS 200 and the various components thereof. The data generated by building subsystems 228 can include measured or calculated values that exhibit statistical characteristics and provide information about how the corresponding system or process (e.g., a temperature control process, a flow control process, etc.) is performing in terms of error from its setpoint. These processes can be examined by FDD layer 216 to expose when the system begins to degrade in performance and alarm a user to repair the fault before it becomes more severe.

Systems and Methods for Analyzing Alarm Panels

Figure 3:
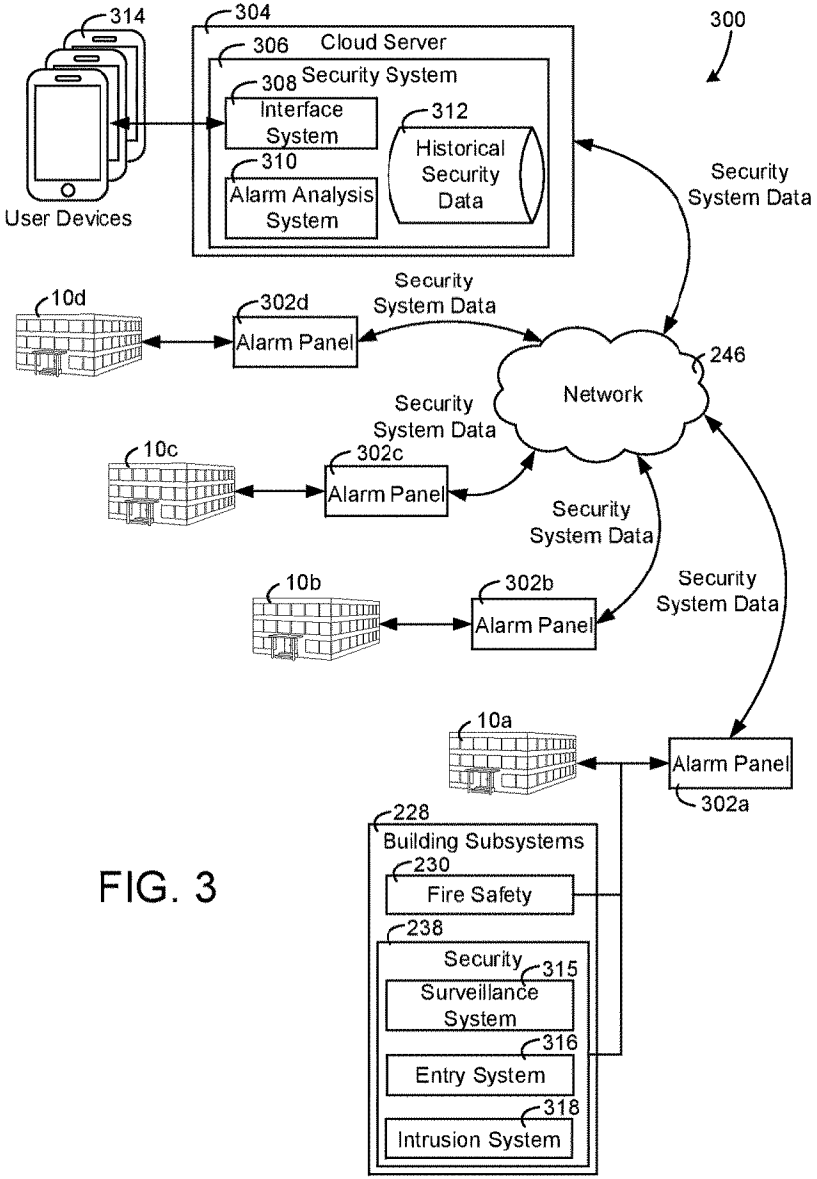
FIG. 3 is a block diagram of building security systems for multiple buildings communicating with a cloud based security system, according to an exemplary embodiment.

Referring now to FIG. 3, a security system 300 is shown for multiple buildings, according to an exemplary embodiment. The security system 300 is shown to include buildings 10a-10d. Each of buildings 10a-10d is shown to be associated with a corresponding alarm panel 302a-302d. The buildings 10a-10d may be the same as and/or similar to building 10 as described with reference to FIG. 1. The alarm panels 302a-302d may be one or more controllers, servers, and/or computers located in a security panel or part of a central computing system for a building.

The alarm panels 302a-302d may communicate with various security sensors that are part of the building subsystems 228. For example, fire safety subsystems 230 may include various smoke sensors and alarm devices, carbon monoxide sensors and alarm devices, etc. The security subsystems 238 are shown to include a surveillance system 315, an entry system 316, and an intrusion system 318. The surveillance system 315 may include various video cameras, still image cameras, and image and video processing systems for monitoring various rooms, hallways, parking lots, the exterior of a building, the roof of the building, etc. The entry system 316 can include one or more systems configured to allow users to enter and exit the building (e.g., door sensors, turnstiles, gated entries, badge systems, etc.) The intrusion system 318 may include one or more sensors configured to identify whether a window or door has been forced open. The intrusion system 318 can include a keypad module for arming and/or disarming a security system and various motion sensors (e.g., IR, PIR, etc.) configured to detect motion in various zones of the building 10a.

Each of buildings 10a-10d may be located in various cities, states, and/or countries across the world. There may be any number of buildings 10a-10b. The buildings 10a-10b may be owned and operated by one or more entities. For example, a grocery store entity may own and operate buildings 10a-10d in a particular geographic state. The alarm panels 302a-302d may record data from the building subsystems 228 and communicate collected security system data to the cloud server 304.

The cloud server 304 is shown to include a security system 306 that receives the security system data from the alarm panels 302a-302d of the buildings 10a-10d. The cloud server 304 may include one or more processing circuits (e.g., memory devices, processors, databases) configured to perform the various functionalities described herein. The processing circuits may be the same and/or similar to the processing circuit 204, the processor 206, and/or the memory 208 as described with reference to FIG. 2. The cloud server 304 may be a private server. In some embodiments, the cloud server 304 is implemented by a cloud system, examples of which include AMAZON WEB SERVICES® (AWS) and MICROSOFT AZURE®.

In some embodiments, the cloud server 304 can be located on premises within one of the buildings 10a-10d. For example, a user may wish that their security, fire, or HVAC data remain confidential and have a lower risk of being compromised. In such an instance, the cloud server 304 may be located on-premises instead of within an off-premises cloud platform.

The security system 306 may implement an interface system 308, an alarm analysis system 310, and a database storing historical security data 312, security system data collected from the alarm panels 302a-302d. The interface system 308 may provide various interfaces of user devices 314 for monitoring and/or controlling the alarm panels 302a-302d of the buildings 10a-10d.

Security systems e.g., the alarm panel 302a, can protect residential or commercial premises by implementing functionality e.g., intrusion detection, access control, video surveillance, and fire detection. In each case, sensors deployed at various locations in and around the building transmit data back to a central system for analysis, e.g., the alarm panels 302a-302d. In some instances, such data is further transmitted to an offsite location that serves as a monitoring center, e.g., the alarm analysis system 310. In either case, the sensor data can be analyzed to determine if a condition exists at the premises that requires attention by a security professional. For example, if a motion sensor detects that someone has entered a building at a time that the intrusion system is armed or if an access control system detects that a door is being forced open, that information is transmitted to the local or remote monitoring center which can deploy security guards or call the police.

Unfortunately, such security systems for detecting alarms (e.g., a fire, an intrusion, etc.) may not be foolproof. If a sensor is going bad or requires maintenance, it may produce spurious data falsely indicating that there has been a security breach. For example, a smoke detector may indicate the presence of smoke in the building when it is simply an accumulation of dust on the device. Likewise, a contact switch on a warehouse door may indicate that the door has been opened when, in fact, the magnetic switch has simply stopped working correctly. Such false alarm situations can be numerous and can cost building owners a substantial amount of money each year in business down-time, security agency response fees, and maintenance personnel truck rolls. In many instances, the purported cause of a false alarm is repaired but other related problems exist with the systems that are not detected until further false alarms events occur.

In some instances, some buildings 10a-10d may be located in geographical locations which are more prone to crime. As such, these buildings 10a-10d may experience more alarm events (e.g., rather than false alarms). In these instance, it may be advantageous for owners or operators of the buildings 10a-10d to be made aware of the number of alarm events so that such owners/operators may reinforce their security measures at the corresponding buildings 10a-10d.

Referring now to FIG. 4, a block diagram of the alarm analysis system 310 as described with reference to FIG. 3 is shown, according to an exemplary embodiment. The alarm analysis system 310 can be configured to identify patterns of alarm events based on event data reported by the alarm panels 302a-302d. Such patterns may be used for diagnosing errors in the alarm panels 302a-302d, security equipment or sensors, and for upgrading security systems as needed. The alarm analysis system 310 is shown to include a processing circuit 402 that includes a processor 404 and a memory 406. The memory 406 can include instructions which, when executed by the processor 404, cause the processor 404 to perform the one or more functions described herein. The processor 404 may be the same and/or similar to the processor 206 as described with reference to FIG. 2 and the memory 406 may be the same as and/or similar to the memory 208 as described with reference to FIG. 2.

In addition to a traditional processor and memory, the processing circuit 402 may include integrated circuitry for processing and/or control, e.g., one or more processors and/or processor cores (e.g., microprocessor and/or microcontroller) and/or FPGAs (Field Programmable Gate Array) and/or ASICs (Application Specific Integrated Circuitry). The processing circuit 402 can include and/or be connected to and/or be configured for accessing (e.g., writing to and/or reading from) the memory 406, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory).

The memory 406 can be configured to store code executable by control circuitry and/or other data, e.g., data pertaining to communication, e.g., configuration and/or address data of nodes, etc. The processing circuit 402 can be configured to implement any of the methods described herein and/or to cause such methods to be performed, e.g., by the processor 404. Corresponding instructions may be stored in the memory 406, which may be readable and/or readably connected to the processing circuit 402. It may be considered that the processing circuit 402 includes or may be connected or connectable to the memory 406, which may be configured to be accessible for reading and/or writing by the controller and/or the processing circuit 402.

The security system 302a includes a communication interface 408. The communication interface 408 is configured to facilitate communicate with a domain expert device 410 and/or the alarm panels 302 in some embodiments. Furthermore, the communication interface 408 can be configured to communicate with all of the devices and systems described with reference to FIG. 3.

Via the communication interface 408, the historical security database 412 can be configured to receive (collect) and store security system data from the security system 302a. The security system data may be events (e.g., alarm events) such as an occurrence detected by a sensor of the security system 302a. For example, an intrusion sensor or other burglary alarm may identify that an individual is trying to force a window or door open. Another event may be a door being opened or closed. The detection of an occupant walking through the door may also be an event. As another example, a hold-up alarm may be triggered when a person (e.g., a robber) attempts a hold-up of a business. The alarm events 414 may be binary (e.g., indicating a high, or "1", when the alarm event is detected). In some embodiments, the alarm events 414 can further include signals containing various information, such as which sensor triggered the alarm event 414, a location (e.g., within a building 10a-10d, which particular building 10a-10d) corresponding to the sensor, etc. In each of these embodiments, the historical security database 412 may be configured to store an event type for the alarm event 414, and data corresponding to the building 10a-10d associated with the alarm event 414. The historical security database 412 may receive and store the alarm event 414, and may store the alarm event type (e.g., burglary alarm, hold-up alarm, fire alarm, etc.) based on data contained in the alarm event 414, since the particular sensor sent a binary high, and so forth. The historical security database 412 may store the data corresponding to the building 10a-10d associated with the alarm event 414 based on data contained in the alarm event 414, since the particular sensor which sent the binary high is located at a particular building 10a-10d, etc.

The memory 406 is shown to include an event classifier 416. The event classifier 416 can be configured to classify the alarm panels 302a-302d. The event classifier 416 may classify the alarm panels 302a-302d according to the alarm events received via the communications interface 408 from the respective alarm panels 302a-302d. As described above, the alarm panels 302a-302d can be configured to communicate events 414 responsive to triggers or signals from respective sensors in or corresponding to the building 10a-10d. The alarm panels 302a-302d can be configured to communicate the alarm events 414 in real-time, at various intervals (e.g., the end of business, end of the day, end of the week, etc.). The alarm events 414 may be stored in the historical security database 412 (with data associated therewith). The event classifier 416 may be communicably coupled to the historical security database 412 and, therefore, may access the alarm events 414 stored therein for each alarm panel 302a and data associated therewith.

The event classifier 416 can be configured to identify an alarm type for each alarm event 414. The event classifier 416 can be configured to access the historical security database 412. As described above, the historical security database 412 may store the alarm type for each alarm event 414. The event classifier 416 can be configured to retrieve, from the historical security database 412, the alarm events 414 and data associated therewith (e.g., the alarm type, the sensor location within the building 10a-10d which triggered the alarm event 414, the particular building in which the alarm event 414 occurred, etc.). In receiving such data, the event classifier 416 can quantify particular occurrences of each alarm event type, which may be used for diagnosing faults within the security system, bolstering the security system as needed, etc.

In some embodiments, the event classifier 416 can be configured to receive data corresponding to whether various alarm events 414 are false alarms. For instance, the alarm panels 302a-302d can be configured to communicate alarm events 414 to the historical security database 412 upon a triggering event from an alarm sensor in a particular security system for a building 10a-10d. An authorized user device 314 may subsequently communicate a false alarm signal associated with the alarm event 414 (e.g., following a user inspecting the building 10a-10d determining that the alarm event 414 was a false alarm). The historical security database 412 may be configured to receive and store the false alarm signal associated with the particular alarm event 414. Such data may be used for identifying faults in security systems, required updates, etc., particularly where reoccurring false alarm signals are received for the same sensor(s) in a given building 10a-10d.

The event classifier 416 can be configured to determine, quantify, or evaluate a number of occurrences of each alarm type for each alarm panel 302a-302d. The event classifier 416 can be configured to identify the alarm type for the data corresponding to particular alarm events 414 (e.g., described above). The event classifier 416 may be configured to build a matrix or dataset corresponding to each alarm panel 302a-302d. Each cell (also referred to herein as "data point") in the matrix or dataset may define the number of occurrences of each alarm type. For purposes of a simple example, a building 10a-10d may have two types of alarms—burglary alarms and hold-up alarms. Hence, the alarm panels 302a-302d may report, provide, communicate, etc. alarm events 414 for burglary events and hold-up events. A given building 10a may have, for a duration (e.g., a month, a week, a year, etc.) ten burglary events and two hold-up events. For the building 10a, the event classifier 416 can generate a cell for the building which indicates the number of alarm events 414 (e.g., a cell [10,2]). As the event classifier 416 identifies new alarm events 414 (e.g., within the historical security database 412), the event classifier 416 can be configured to update, revise, edit, etc. the matrix or dataset and corresponding cells or data points. Hence, each data point may represent a number of occurrences of each alarm type for a respective alarm panel 302a-302d.

In some embodiments, the event classifier 416 can be configured assign a weight to particular alarm events 414. The event classifier 416 may assign weights to particular alarm events 414 based on alarm type. For instance, the event classifier 416 may apply a greater weight to some alarm types (such as hold-up alarm events 414), a lesser weight to some alarm types (such as fire or smoke alarm events 414). The weights may be generated, created or determined by a security administrator on a corresponding user device, such as the domain expert device 410, and communicated to the event classifier 416. The weights may be defaulted to "1", and increased or decreased by the security administrator on the user device 314. The event classifier 416 can be configured to multiply the number of occurrences of particular alarm events 414 by their corresponding weight. The weights may be used for modifying the dataset to emphasize or prioritize particular alarm events 414, as described in greater detail below.

The event classifier 416 can be configured to identify statistical dividers in the dataset. The statistical dividers may be used for assigning a ranking of each of the data points and, correspondingly, alarm panels 302a-302d. The event classifier 416 can be configured to analyze the dataset to compute the statistical dividers, as described in greater detail below. The event classifier 416 can be configured to generate a graphical representation of the dataset. The graphical representation can include each of the data points or cells within the dataset. Hence, the graphical representation can represent each alarm type and corresponding number of occurrences for each alarm panel 302a-302d.

Figure 5:
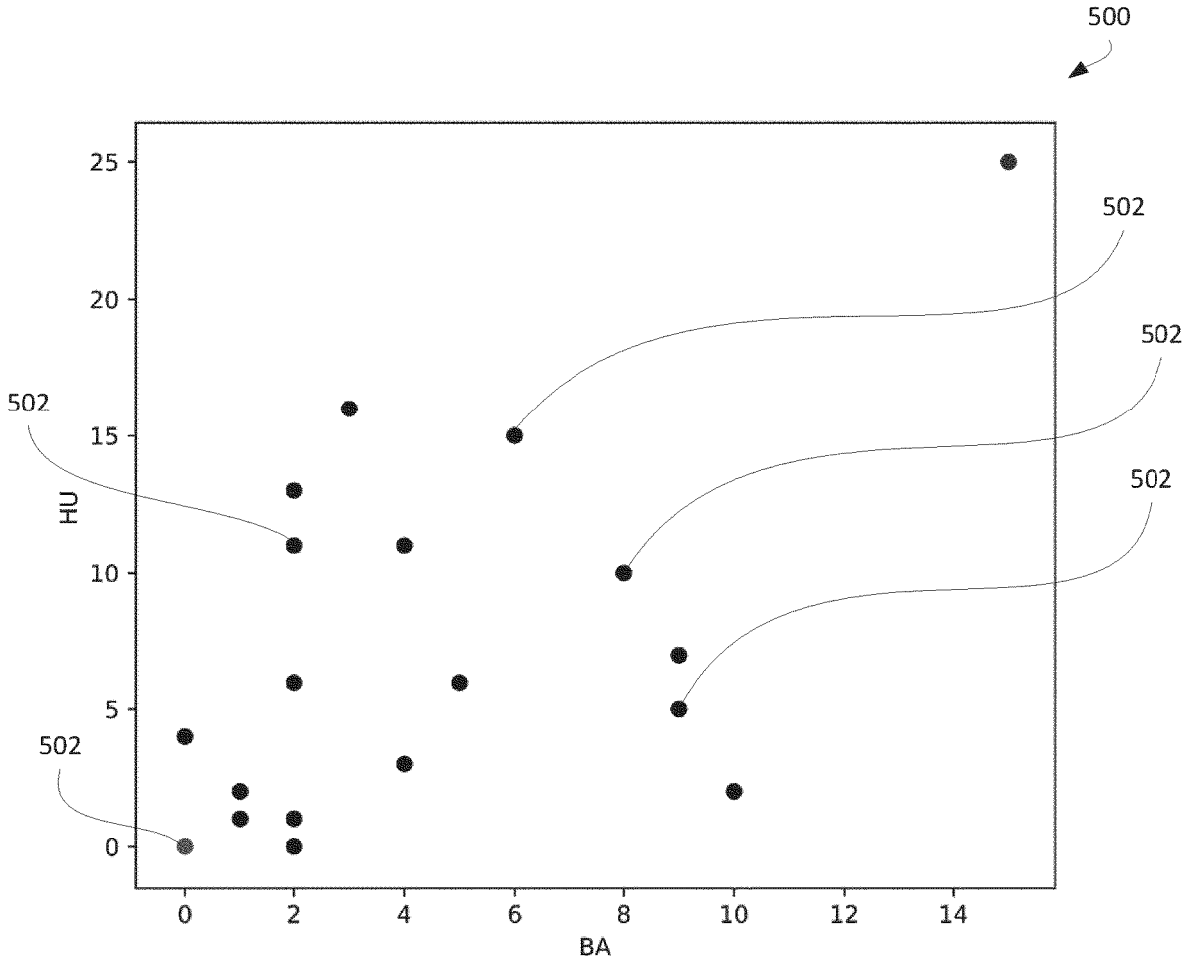
FIG. 5 is a graphical representation of an example dataset, according to an exemplary embodiment

Referring now to FIG. 5, a graphical representation 500 of an example dataset is shown, according to an exemplary embodiment. While the graphical representation 500 shown in FIG. 5 is two dimensional (for purposes of illustrating a simple example), the graphical representation 500 may include any number of dimensions. For instance, the graphical representation 500 may include a third dimension which quantifies the number of fire alarm events, false alarm events or bypasses, etc.

In the graphical representation 500 depicted in FIG. 5, each data point 502 corresponds to a particular alarm panel 302a-302d. Additionally, each data point 502 may have an x component and a y component. The x component may be the number of burglary alarm events (BA) for the alarm panel 302a-302d, and the y component may be the number of hold-up alarm events (HU) for the alarm panel 302a-302d. The event classifier 416 can be configured to apply one or more filters to the dataset. For instance, the event classifier 416 can filter data points 502 for alarm panels 302a-302d which have zero occurrences of each of the alarm types (e.g., zero burglary alarm events and zero hold-up alarm events). The event classifier 416 can be configured to filter outlier data points 502. As one example, the event classifier 416 can be configured to calculate a standard deviation for the dataset and filter alarm panels which fall outside of a number of standard deviations from a mean or median number of alarm events. As shown in the graphical representation 500, the dataset may be filtered to remove two alarm panels 302 (e.g., one outlier and one alarm panel 302 having zero occurrences of alarm events).

Figure 6:
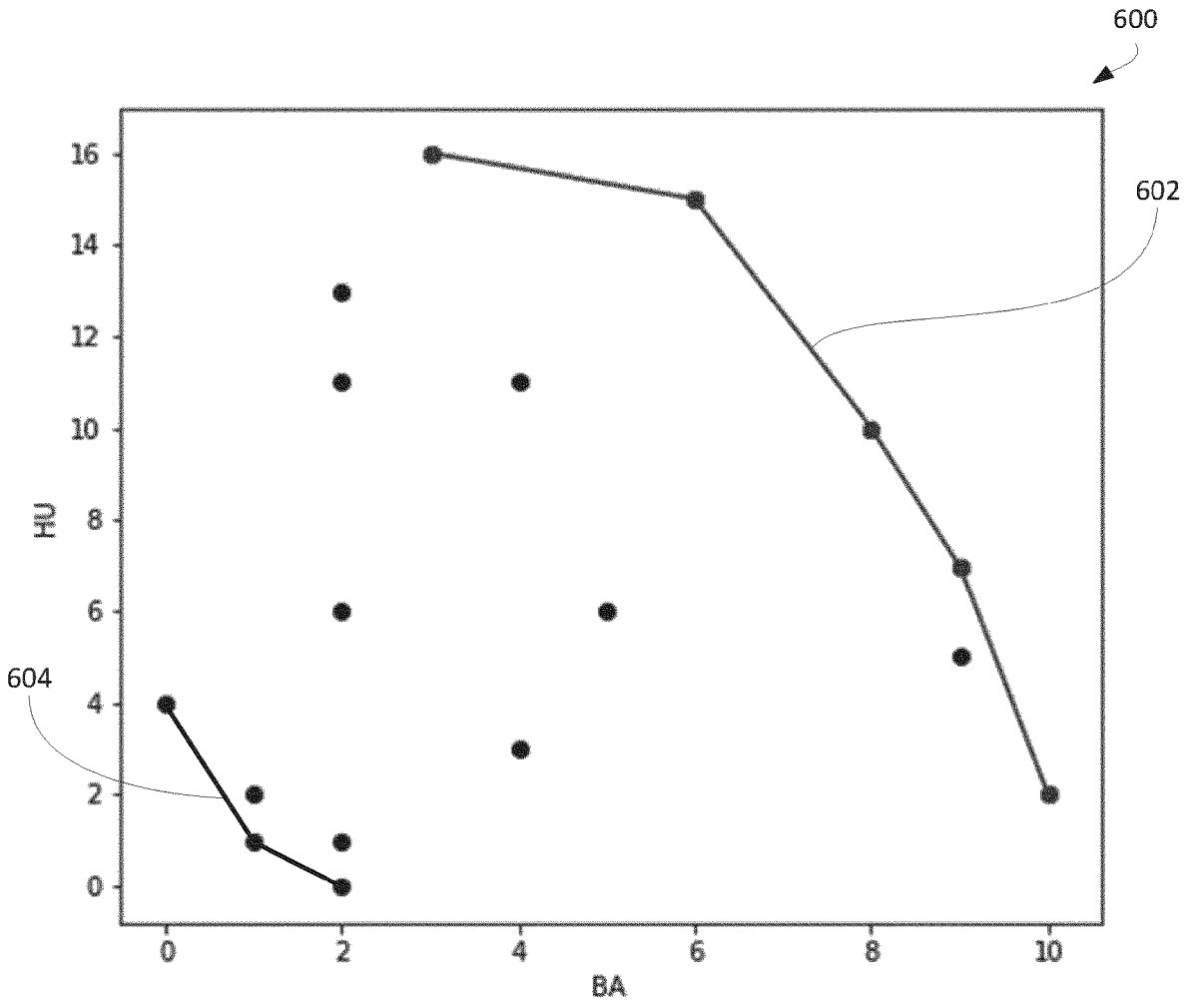
FIG. 6 is a graphical representation of the example dataset of FIG. 5 following application of one or more filters, according to an exemplary embodiment.

Referring now to FIG. 6, a graphical representation 600 of the example dataset of FIG. 5 following application of the one or more filters, according to an exemplary embodiment. The event classifier 416 can be configured to compute an upper Pareto frontier 602 and/or a lower Pareto frontier 604 within the graphical representation 600. The event classifier 416 can be configured to compute the upper Pareto frontier 602 by determining maximum dominate data points within the filtered dataset. Similarly, the event classifier 416 can be configured to compute the lower Pareto frontier 604 by determining minimum dominate data points within the filtered dataset. The event classifier 416 can be configured to analyze each of the data points 502 in the filtered dataset.

Generally speaking, Pareto analysis solves an optimization problem. The event classifier 416 analyzes the dataset to determine optimal solutions. The event classifier 416 defines an order or relation on the data points within the dataset. In a bidirectional case where maximization of objectives is of importance, for two data points [(3,4) and (2,4)], (3,4) dominates (2,4) because 3>=2 and 4>=4. In a bidirectional case where minimization of objectives is of importance, for two data points [(1,2) and (3,4)], (1,2) dominates (3,4) because 1<=3 and 2<=4. In a Pareto frontier, each of the dominant data points are a set of multi-objective solutions which are not dominated by any other existing solution, or a set of optimal or undominated solutions.

The event classifier 416 can determine the maximum and minimum dominant data points. The event classifier 416 can connect the maximum dominant points to form the upper Pareto frontier 602, and connect the minimum dominant points to form the lower Pareto frontier 604.

Figure 7:
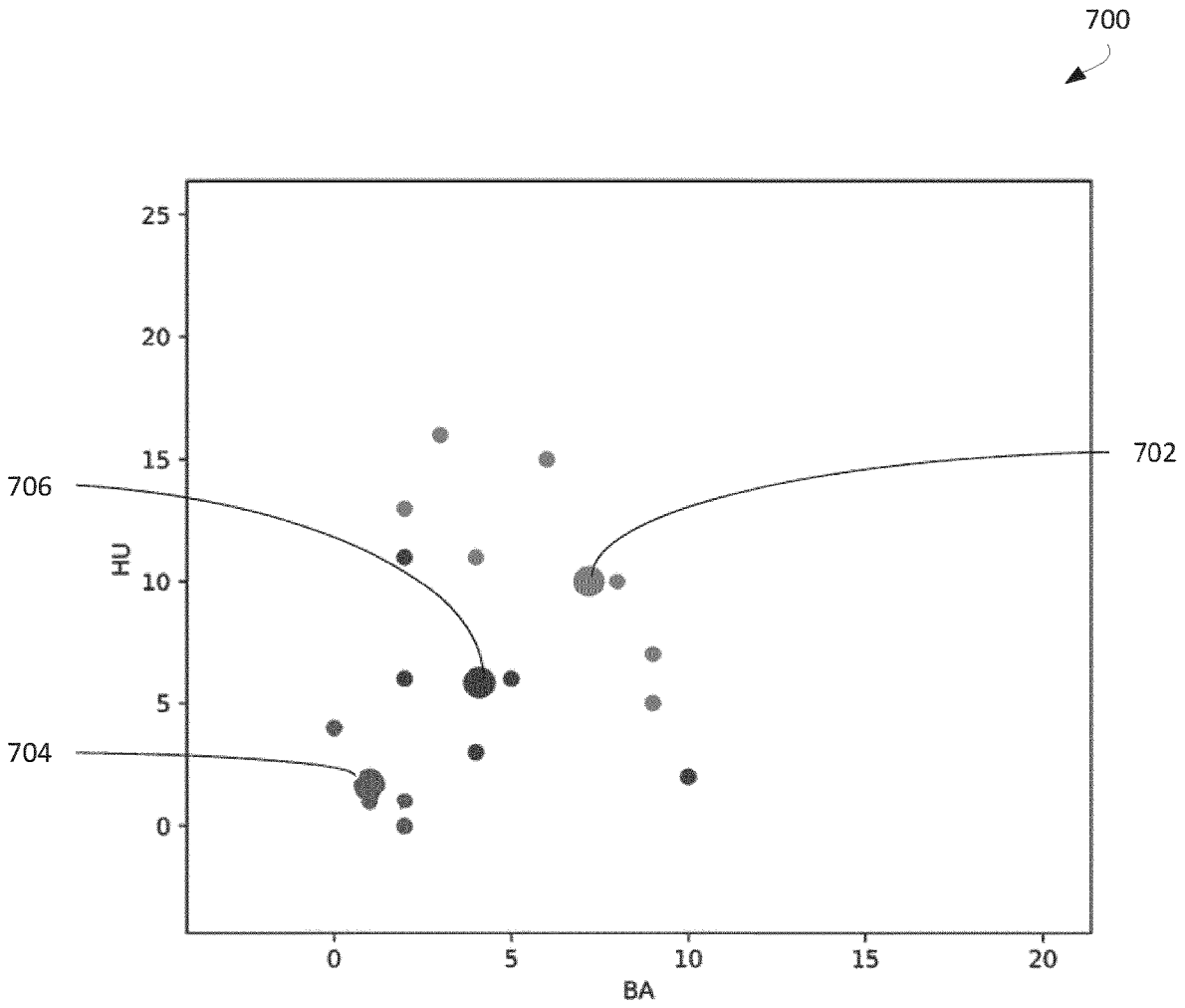
FIG. 7 is a graphical representation including upper and lower Pareto centroids and a midpoint for the filtered dataset, according to an exemplary embodiment.

Referring now to FIG. 7, a graphical representation 700 including upper and lower Pareto centroids 702, 704 and a midpoint 706 for the filtered dataset is shown, according to an exemplary embodiment. The event classifier 416 can be configured to compute the upper Pareto centroid, $C_{UPF}$, 702 for the upper Pareto frontier 602 and the lower Pareto centroid, $C_{LPF}$, 704 for the lower Pareto centroid 604. The event classifier 416 may compute the upper Pareto centroid 702 by averaging the data points located along the upper Pareto frontier 602. Continuing the example shown in FIG. 6, the upper Pareto frontier 602 includes data points at (3,16), (6,15), (8,10), (9,7), and (10,2). The event classifier 416 can be configured to compute the average for the x values—e.g., (3+6+8+9+10)/5, or 7.7—and the average for the y values—e.g., (16+15+10+7+2)/5, or 10. The event classifier 416 can define the upper Pareto centroid 702 as the average x and y values, or (7.7, 10). Similarly, the event classifier 416 may compute the lower Pareto centroid 704 by averaging the data points located along the lower Pareto frontier 604. Continuing the example in FIG. 6, the lower Pareto frontier 604 includes data points at (0,4), (1,1), and (2,0). The event classifier 415 can be configured to compute the average for the x values—e.g., (0+1+2)/3, or 1—and the average for they values—e.g., (4+1+0)/3, or 1.33. The event classifier 416 can define the lower Pareto centroid 704 as the average x and y values, or (1, 1.33).

The event classifier 416 can be configured to calculate the midpoint, $C_{MPF}$,706 between the upper Pareto centroid 702 and lower Pareto centroid 704. The event classifier 416 can be configured to calculate the midpoint 706 by averaging the x values for the upper Pareto centroid 702 and lower Pareto centroid 704—e.g., (7.7+1)/2, or 4.35—and averaging the y values for the upper Pareto centroid 702 and lower Pareto centroid 704—e.g., (10+1.33)/2, or 5.66. The event classifier 416 can define the midpoint 706 as the average x and y values, or (4.35, 5.66).

The event classifier 416 can be configured to define a number of statistical dividers in the dataset. The event classifier 416 can be configured to define the statistical dividers in several different ways, some of which will be described herein. The event classifier 416 can assign rankings to each of the data points in the dataset according to their location in relation to the statistical dividers, as described in greater detail below.

Figure 8:
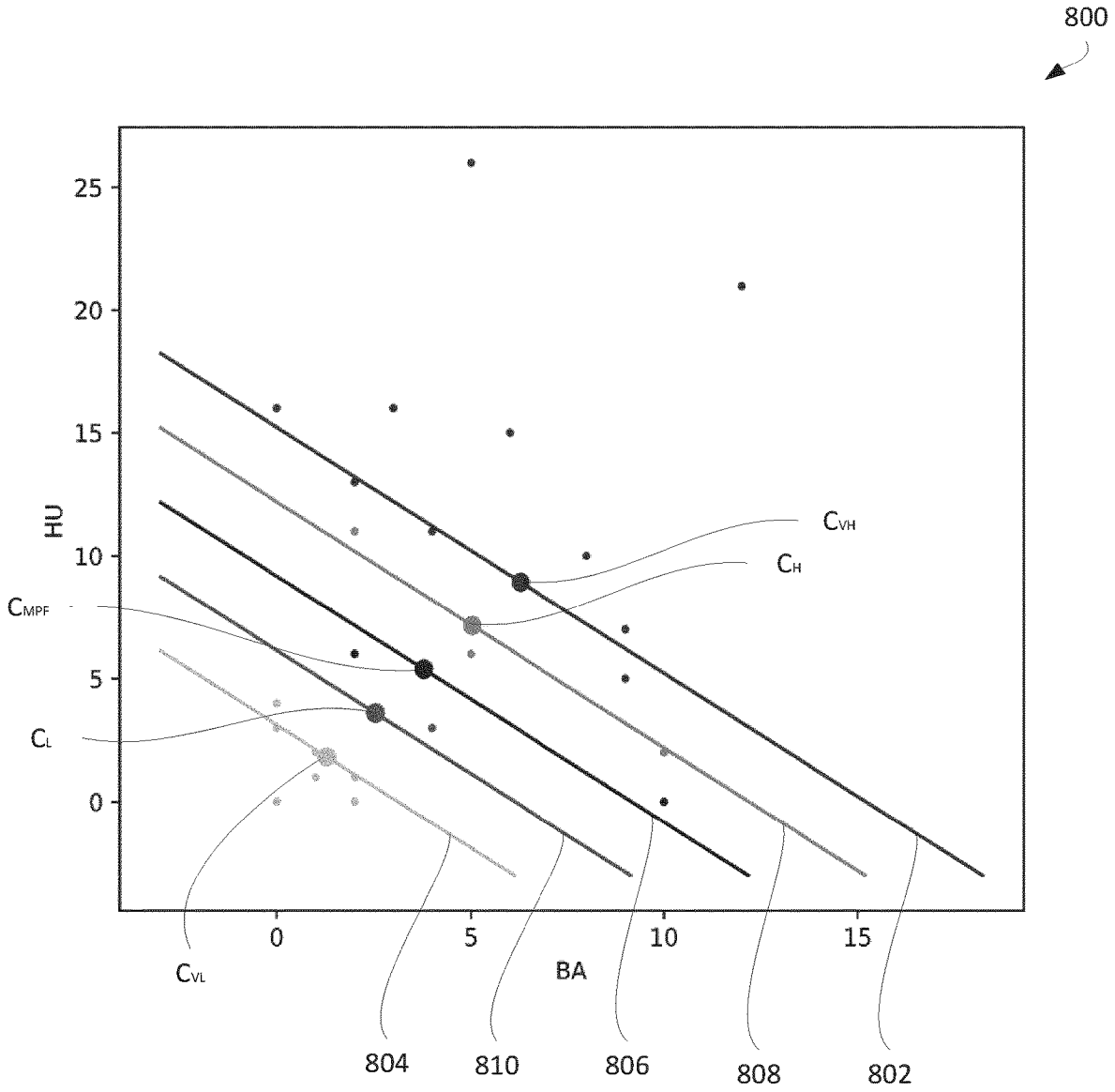
FIG. 8 is a graphical representation of the dataset including a plurality of statistical dividers, according to an exemplary embodiment.

Referring now to FIG. 8, a graphical representation 800 of the dataset including a plurality of statistical dividers 802-810 is shown, according to an exemplary embodiment. In the embodiment shown in FIG. 8, the statistical dividers 802-810 are hyperplanes—though, as described in greater detail below, the statistical dividers may take different shapes. In some embodiments, the event classifier 416 can be configured to define an upper statistical divider 802, a lower statistical divider 804, and a middle statistical divider 806. The event classifier 416 may construct the statistical dividers 802-806 to extend parallel to one another (e.g., be equidistant from one another) and in relation to at least one of the upper Pareto centroid $C_{UPF}$ 702, the lower Pareto centroid $C_{UPF}$ 704, and/or the midpoint $C_{MPF}$ 706.

The event classifier 416 can be configured to select a value, $\alpha$, which defines a spacing between the statistical dividers. In some embodiments, the event classifier 416 receives the value a via the communications interface 408 from the domain expert device 510. In some embodiments, the value a is a preset value used by the event classifier 416. The value a may have a fixed, or limited, range of possible values. In some embodiments, the value a may be between zero and one (e.g., $0<\alpha<1$). In some embodiments, the value a may be between zero and 0.5 (e.g., $0<\alpha<0.5$). In some embodiments, the value a may be between zero and 0.25 (e.g., $0<\alpha<0.25$).

The event classifier 416 can be configured to define the statistical dividers using the value a. In some embodiments, the event classifier 416 defines the statistical dividers by constructing one of the statistical dividers to extend through one of the upper Pareto centroid $C_{UPF}$ 702, lower Pareto centroid $C_{LPF}$ 704, and midpoint $C_{MPF}$ 706. The event classifier 416 may define the remaining statistical dividers by performing shifts from the constructed statistical divider.

In some embodiments, the event classifier 416 can be configured to first define middle statistical divider 806. The event classifier 416 may define the middle statistical divider 806 as extending through the midpoint $C_{MPF}$ 706. The middle statistical divider 806 may have a slope of (−1). The event classifier 416 may define the upper statistical divider 802 and lower statistical divider 804 in relation to the middle statistical divider 806. The event classifier 416 can be configured to calculate a centroid $C_{VH}$ for the upper statistical divider 802 as $C_{VH}=(1+2\alpha)C_{MPF}$. The event classifier 416 can be configured to calculate a centroid $C_{VL}$ for the lower statistical divider 804 as $C_{VL}=(1-2\alpha)C_{MPF}$. In some embodiments, the event classifier 416 can be configured to calculate a centroid $C_H$ for the middle upper statistical divider 808 as $C_H=(1+\alpha)C_{MPF}$, and a centroid $C_L$ for the middle lower statistical divider 810 as $C_L=(1-\alpha)C_{MPF}$. The event classifier 416 can be configured to define each of the statistical dividers (e.g., the upper statistical divider 802, the middle upper statistical divider 808, the middle lower statistical divider 810, and the lower statistical divider 804) in relation to the middle statistical divider 806. Each of the statistical dividers 802-804 and 808-810 as extending parallel to the middle statistical divider 806 and through their corresponding centroids (e.g., $V_{VH}$, $C_{VL}$, $C_H$, and $C_L$ respectively). Such embodiments and examples are shown in FIG. 8.

Figure 9:
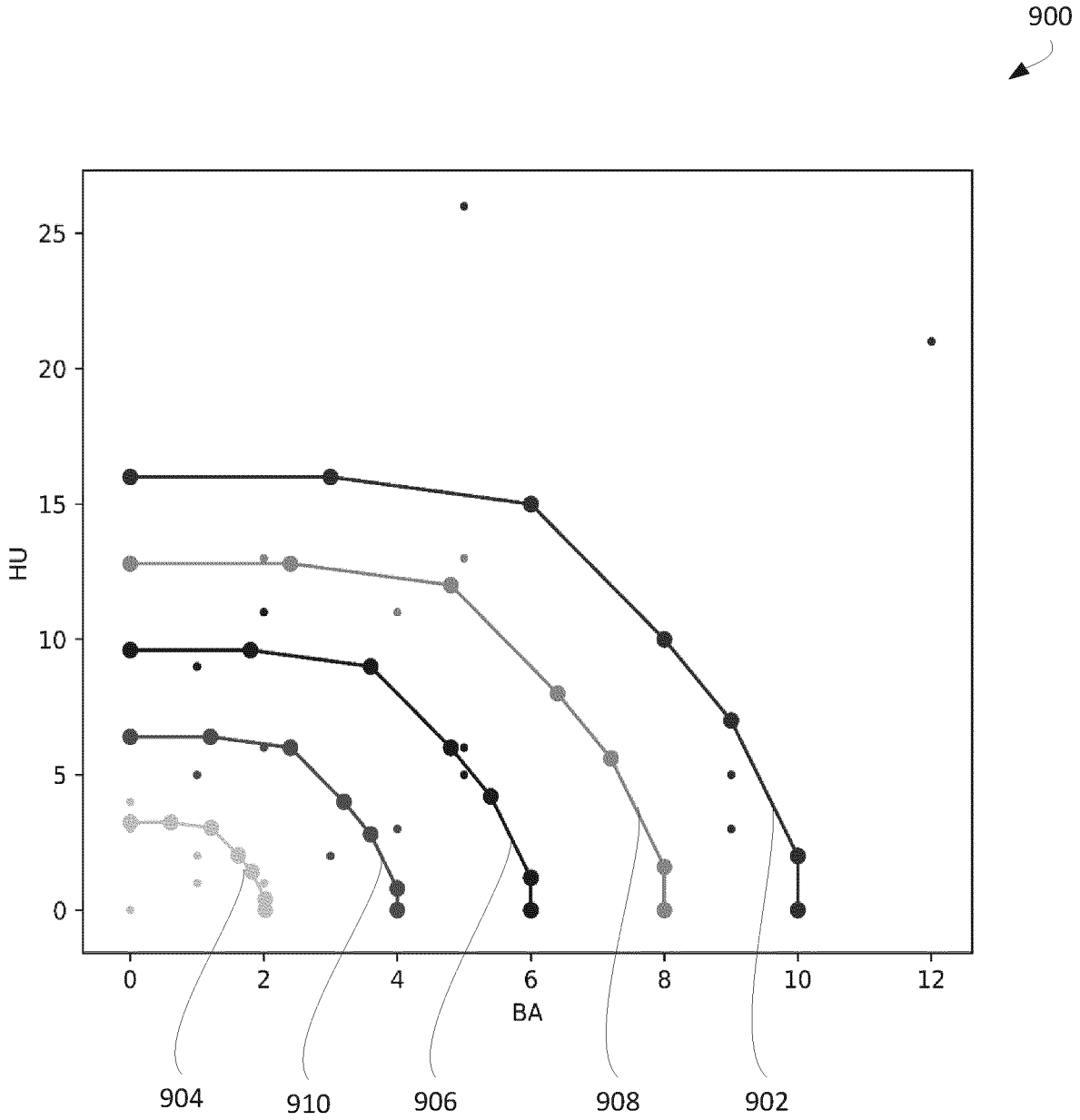
FIG. 9 is another example graphical representation of the dataset including a plurality of statistical dividers, according to an exemplary embodiment.

Referring now to FIG. 9, another example graphical representation 900 of the dataset including a plurality of statistical dividers 902-910 is shown, according to an exemplary embodiment. In the embodiment shown in FIG. 9, the statistical dividers 902-910 take the shape of one of the Pareto curves. Hence, the statistical dividers 902-910 are themselves Pareto curves. In some embodiments, the event classifier 416 can be configured to first define the upper statistical divider 902. The event classifier 416 may define the upper statistical divider $UPF_D$ 902 along the upper Pareto frontier 602. In this embodiment, the upper statistical divider 902 follows along the upper Pareto frontier 602. The event classifier 416 may define the middle upper statistical divider 908, middle statistical divider 906, the middle lower statistical divider 910, and lower statistical divider 904 in relation to the upper statistical divider 802. The event classifier 416 can be configured to calculate data points for the middle upper statistical divider 908 according to $UPF_H=(1-\alpha)\ UPF_D$. The event classifier 416 can be configured to calculate data points for the middle statistical divider 906 according to $UPF_M=(1-2\alpha)\ UPF_D$. The event classifier 416 can be configured to calculate data points for the middle lower statistical divider 910 according to $UPF_L=(1-3\alpha)\ UPF_D$. The event classifier 416 can be configured to calculate data points for the lower statistical divider 904 according to $UPF_{VL}=(1-4\alpha)\ UPF_D$.

In some embodiments, the event classifier 416 can be configured to first define the lower statistical divider 904. The event classifier 416 may define the lower statistical divider $UPF_A$ 904 along the lower Pareto frontier 604. In this embodiment, the lower statistical divider 904 follows along the lower Pareto frontier 604. The event classifier 416 may define the upper statistical divider 902, middle upper statistical divider 908, middle statistical divider 906, and the middle lower statistical divider 910 in relation to the lower statistical divider 904. The event classifier 416 can be configured to calculate data points for the upper statistical divider 902 according to $UPF_{VH}=(1+4\alpha)\ UPF_A$. The event classifier 416 can be configured to calculate data points for the middle upper statistical divider 902 according to $UPF_{VH}=(1+3\alpha)$. The event classifier 416 can be configured to calculate data points for the middle statistical divider 906 according to $UPF_M=(1+2\alpha)\ UPF_D$. The event classifier 416 can be configured to calculate data points for the middle lower statistical divider 910 according to $UPF_L=(1+\alpha)\ UPF_D$.

Referring back to FIG. 4, the event classifier 416 can be configured to assign a ranking to each of the data points in the dataset (e.g., the full dataset prior to any filtering described above). The event calculator 416 can be configured to assign the ranking to each of the data points based on their location in relation to the statistical dividers defined by the event calculator 416 and described above. The possible rankings may be defined by the number of statistical dividers. For instance, continuing the example above, the event calculator 416 can select a ranking of very high, high, middle, low, and very low since there are five statistical dividers. However, the number of rankings may increase or decrease in accordance with the number of statistical dividers.

The event classifier 416 can be configured to analyze the location of each data point in relation to the statistical dividers. In some embodiments, the event classifier 416 is configured to determine a proximity of a given data point in relation to the statistical dividers. The event classifier 416 can be configured to assign a ranking to the data point corresponding to the statistical divider nearest to the data point. For instance, where a given data point is located nearest to the upper statistical divider, the data point may be assigned a very high ranking, where a given data point is located nearest to the middle upper statistical divider, the data point may be assigned a high ranking, where a given data point is located nearest to the middle statistical divider, the data point may be assigned a middle ranking, where a given data point is located nearest to the middle lower statistical divider, the data point may be assigned a low ranking, and where a given data point is located nearest to the lower statistical divider, the data point may be assigned a very low ranking.

In some embodiments, the event classifier 416 assigns a ranking to a data point based on which statistical dividers the data point is located between. For instance, where a given data point is located between the upper and middle upper statistical dividers, the data point may be assigned a very high ranking, where a given data point is located between the middle upper and middle statistical dividers, the data point may be assigned a high ranking, where a given data point is located between the middle and middle lower statistical dividers, the data point may be assigned a middle ranking, where a given data point is located between the middle lower and lower statistical dividers, the data point may be assigned a low ranking, and where a given data point is located beneath lower statistical divider, the data point may be assigned a very low ranking. As another example, where a given data point is located above the upper statistical divider, the data point may be assigned a very high ranking, where a given data point is located between the upper and middle upper statistical dividers, the data point may be assigned a high ranking, where a given data point is located between the middle upper and middle statistical dividers, the data point may be assigned a middle ranking, where a given data point is located between the middle and middle lower statistical dividers, the data point may be assigned a low ranking, where a given data point is located between the middle lower and lower statistical dividers, the data point may be assigned a very low ranking.

The interface system 308 can be configured provide, provision, or otherwise render a monitoring dashboard to the user device 314 (e.g., on a display for the user device 314). The interface system 308 is shown to include a dashboard generator 424. The dashboard generator 424 can be configured to receive the rankings from the event classifier 416. The dashboard generator 424 can be configured to generate the monitoring dashboard. The monitoring dashboard may be, for instance, a listing of rankings for each of the alarm panels 302. The monitoring dashboard may be a listing of rankings for a subset of the alarm panels 302. For instance, the monitoring dashboard may be configured to identify those alarm panels 302 having a ranking which is higher than a middle ranking, higher than a high ranking, etc. The dashboard generator 424 can be configured to communicate the monitoring dashboard (or various information or data for rendering the monitoring dashboard) to the user device 314 for rendering. An end user may view the monitoring dashboard and may replace or modify various security sensors, increase security measures by adding additional security sensors, etc.

Figure 10:
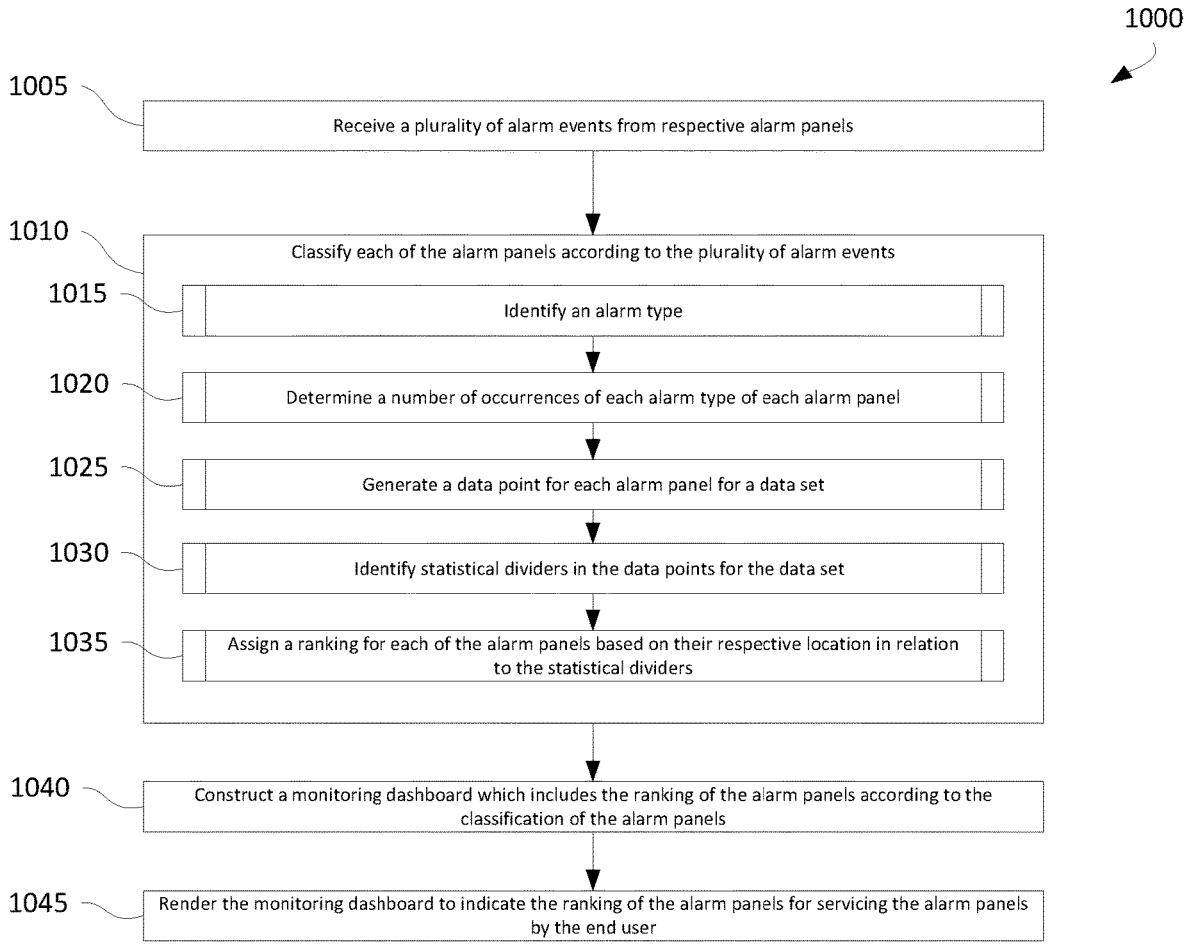
FIG. 10 is a flow diagram of a process that can be performed by the alarm analysis system for analyzing the alarm panels, according to an exemplary embodiment.

Referring now to FIG. 10, a flow diagram of a process 1000 that can be performed by the alarm analysis system 310 for analyzing the alarm panels 302 is shown, according to an exemplary embodiment. The alarm analysis system 310 can be configured to perform the process 1000. Furthermore, any one or combination of the computing devices described herein can be configured to perform the process 1000.

In step 1005, the alarm analysis system 310 can receive a plurality of alarm events 414 from respective alarm panels 302. In some embodiments, the alarm analysis system 310 can receive the plurality of alarm events 414 from the respective alarm panels 302 via the communications interface 408. The communications interface 408 may be communicably coupled to the plurality of alarm panels 302 at respective buildings 10. Hence, the communications interface 408 may be configured to receive alarm events 414 from the alarm panels 302. In some embodiments, the alarm events 414 may indicate an alarm type.

In step 1010, the alarm analysis system 310 can classify the alarm panels 302 according to the plurality of alarm events 414. The process for classifying the alarm panels 302 is described with reference to steps 1015-1035. It is noted that, while showing as being sub-processes of step 1010, in some embodiments, some of the steps 1015-1035 may be performed separately from or outside of step 1010.

In step 1015, the alarm analysis system 310 can identify an alarm type. The alarm analysis system 310 may identify an alarm type for each of the alarm events 414. The alarm analysis system 310 may identify an alarm type for a subset of the alarm events 414. The alarm events 414 may indicate (or include data which indicates) the alarm type. The alarm analysis system 310 may identify the alarm type based on the alarm events 414 (or data from the alarm events 414).

In step 1020, the alarm analysis system 310 can determine a number of occurrences of each alarm type for the alarm panels 302. The alarm analysis system 310 may determine the number of occurrences of each alarm type for each of the alarm panels 302. The alarm analysis system 310 may determine the number of occurrences of each alarm type for a subset of the alarm panels 302. The alarm analysis 310 may compute the number of occurrences of each alarm type by maintaining a ledger of the alarm types identified at step 1015. The alarm analysis system 310 may determine the number of occurrences based on the data contained in the ledger.

In step 1025, the alarm analysis system 310 can generate a data point for a data set corresponding to the alarm panels 302. The data point may represent the number of occurrences of the alarm types for a respective alarm panel 302. The alarm analysis system 310 may generate the data point using the determined number of occurrences of each alarm type (e.g., at step 1020). The alarm analysis system 310 may generate the data point with a structure such that each representation of the alarm panels 302 in a data point have a similar structure. For instance, where an alarm panel 302 has three occurrences of burglary alarms and two occurrences of hold-up alarms, the alarm analysis system 310 may generate a data point of (3, 2) which represents the alarm panel 302.

In step 1030, the alarm analysis system 310 can identify statistical dividers in the data points for the dataset. The statistical dividers may define a separation of rankings for the data points within the dataset. The alarm analysis system 310 can perform Pareto analysis to determine, for instance, a Pareto frontier. The alarm analysis system 310 can determine a centroid for the Pareto frontier. The alarm analysis system 310 may identify the statistical dividers based on the location of the centroid and/or the determined Pareto frontier. In some embodiments, the alarm analysis system 310 can determine two Pareto frontiers (e.g., a minimum [or lower] Pareto frontier and maximum [or upper] Pareto frontier). The alarm analysis system 310 can determine a centroid for the two Pareto frontiers and a midpoint between the two centroids. The alarm analysis system 310 may identify the statistical dividers in relation to the two centroids and/or the midpoint.

In step 1035, the alarm analysis system 310 can assign a ranking for the alarm panels 302 based on their respective location in relation to the statistical dividers. In some embodiments, the alarm analysis system 310 may assign a ranking of very high, high, medium, low, or very low based on the corresponding data point's location with respect to the statistical dividers. The alarm analysis system 310 may assign a ranking to the alarm panels 302 based on which statistical divider the corresponding data point is located nearest to. The alarm analysis system 310 may assign a ranking to the alarm panels 302 based on which statistical dividers the data point located between.

In step 1040, the alarm analysis system 310 can construct a monitoring dashboard which includes the ranking of the alarm panels 302 according to the classification of the alarm panels. In some embodiments, the alarm analysis system 310 can construct the monitoring dashboard to include the ranking of each of the alarm panels 302. In some embodiments, the alarm analysis system 310 can construct the monitoring dashboard to include the ranking of a subset of (including but not limited to one of) the alarm panels 302. The alarm analysis system 310 can construct the monitoring dashboard to list alarm panels 302 having a ranking which exceeds a threshold ranking (e.g., medium ranking, high ranking, etc.).

In step 1045, the alarm analysis system 310 can cause the monitoring dashboard to be rendered on a display to an end user. The alarm analysis system 310 can communicate data corresponding to the monitoring dashboard (e.g., constructed at step 1040) to a user device 314. The user device 314 may then render the monitoring dashboard on the display for the user device 314. The user device 314 may display the monitoring dashboard to indicate the ranking of each (or a subset) of the alarm panels. The user viewing the monitoring dashboard may then service the alarm panels.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for analyzing alarm panels, the system comprising:

a communications interface communicably coupled to a plurality of alarm panels at respective buildings, the communications interface configured to receive alarm events from the alarm panels, the alarm events indicating an alarm type; and a processing circuit configured to:

receive, via the communications interface, a plurality of alarm events from the respective alarm panels;

classify each of the alarm panels according to the plurality of alarm events by:

identifying, for the alarm events, an alarm type;

determining, for the alarm panels, a number of occurrences of each alarm type;

generating, for the alarm panels, a data point for a dataset, the data point representing the number of occurrences of the alarm types for a respective alarm panel;

identifying, for the dataset, statistical dividers in the data points, the statistical dividers defining a separation of rankings for the data points within the dataset; and assign a ranking for the alarm panels based on their respective location in relation to the statistical dividers;

construct a monitoring dashboard which includes the ranking of the alarm panels according to the classification of the alarm panels; and cause the monitoring dashboard to be rendered on a display to an end user, the monitoring dashboard indicating the ranking of the alarm panels.

2. The system of claim 1, wherein the statistical dividers are parallel and equidistant from one another.

3. The system of claim 1, wherein identifying the statistical dividers in the data points comprises:

applying a filter to the data points of the dataset which removes zeros and outliers;

computing an upper Pareto frontier within the dataset;

computing a lower Pareto frontier within the dataset;

computing an upper centroid for the upper Pareto frontier, a lower centroid for the lower Pareto frontier, and a midpoint for the upper centroid and lower centroid; and defining the statistical dividers including an upper statistical divider, a lower statistical divider, and a middle statistical divider in relation to at least one of the upper centroid, lower centroid, and midpoint.

4. The system of claim 3, wherein computing the upper centroid, the lower centroid, and the midpoint comprises:

computing the upper centroid, $C_{UPF}$, for the upper Pareto frontier;

computing the lower centroid, $C_{LPF}$, for the lower Pareto frontier;

computing the midpoint, $C_{MPF}$, between the upper centroid and lower centroid according to $C_{MPF}=(C_{UPF}+C_{LPF})/2$.

5. The system of claim 4, wherein identifying the statistical dividers comprises:

selecting a value, $\alpha$, between 0 and 0.5 which defines a spacing between the statistical dividers;

defining an upper statistical divider centroid, $C_{VH}$, as $C_{VH}=(1+2\alpha)C_{MPF}$;

defining a lower statistical divider centroid, $C_{VL}$, as $C_{VL}=(1-2\alpha)C_{MPF}$;

defining the middle statistical divider, which bisects the midpoint;

defining the upper statistical divider and lower statistical divider as extending through the upper statistical divider centroid and lower statistical centroid and extending parallel to the middle statistical divider.

6. The system of claim 5, wherein identifying the statistical dividers further comprises:

defining a middle upper statistical divider centroid, $C_H$, as $C_H=(1+\alpha)C_{MPF}$; and defining a middle lower statistical divider centroid, $C_L$, as $C_L=(1-\alpha)C_{MPF}$.

7. The system of claim 6, wherein assigning the ranking comprises:

determining, for each data point in the dataset D, a relative location to the upper statistical divider, upper middle statistical divider, middle statistical divider, lower middle statistical divider, and lower statistical divider; and separator assigning a ranking of very high, high, middle, low, and very low to each data point according to the relative location.

8. The system of claim 1, wherein identifying the statistical dividers in the data points comprises:

applying a filter to the data points of the dataset which removes zeros and outliers to generate a filtered dataset D;

computing an upper Pareto frontier ($UPF_D$) for the filtered dataset D;

selecting a value, $\alpha$, between 0 and 0.25 which defines a spacing between the statistical dividers; and computing a plurality of lower Pareto frontiers including a very high Pareto frontier ($UPF_{VH}$), a high Pareto frontier ($UPF_H$), a middle Pareto frontier ($UPF_M$), a low Pareto frontier ($UPF_L$), and a very low Pareto frontier ($UPF_{VL}$) according to:

$$UPF_{VH}=UPF_D$$

$$UPF_H=(1-\alpha)UPF_D$$

$$UPF_M=(1-2\alpha)UPF_D$$

$$UPF_L=(1-3\alpha)UPF_D$$

$$UPF_{VL}=(1-4\alpha)UPF_D;$$

wherein the upper statistical divider is $UPF_{VH}$, the lower statistical divider is $UPF_{VL}$, the middle statistical divider is $UPF_M$, and wherein define the statistical dividers further include an upper middle statistical divider $UPF_H$ and a lower middle statistical divider $UPF_L$.

9. The system of claim 8, wherein assigning the ranking comprises:

determining, for each data point in the dataset D, a relative location to the upper statistical divider, upper middle statistical divider, middle statistical divider, lower middle statistical divider, and lower statistical divider; and assigning a ranking of very high, high, middle, low, and very low to each data point according to the relative location.

10. The system of claim 8, wherein assigning the ranking comprises:

determining, for each data point in the dataset D, which statistical divider a data point is located between from the upper statistical divider, upper middle statistical divider, middle statistical divider, lower middle statistical divider, and lower statistical divider; and assigning a ranking of very high, high, middle, low, and very low to the data point based on which statistical divider the data point is located between.

11. A method for analyzing alarm panels, the system comprising:

receiving, via a communications interface communicably coupled to a plurality of alarm panels at respective buildings, a plurality of alarm events from the respective alarm panels, wherein the communications interface is configured to receive alarm events from the alarm panels, the alarm events indicating an alarm type;

classifying the alarm panels according to the plurality of alarm events by:

identifying, for the alarm events, an alarm type;

determining, for the alarm panels, a number of occurrences of each alarm type;

generating, for the alarm panels, a data point for a dataset, the data point representing the number of occurrences of the alarm types for a respective alarm panel;

identifying, for the dataset, statistical dividers in the data points, the statistical dividers defining a separation of rankings for the data points within the dataset; and assigning a ranking for the alarm panels based on their respective location in relation to the statistical dividers;

constructing a monitoring dashboard which includes the ranking of the alarm panels according to the classification of the alarm panels; and causing the monitoring dashboard to be rendered on a display to an end user, the monitoring dashboard indicating the ranking of the alarm panels.

12. The method of claim 11, wherein the statistical dividers are parallel and equidistant from one another.

13. The method of claim 11, wherein identifying the statistical dividers in the data points comprises:

applying a filter to the data points of the dataset which removes zeros and outliers;

computing an upper Pareto frontier within the dataset;

computing a lower Pareto frontier within the dataset;

computing an upper centroid for the upper Pareto frontier, a lower centroid for the lower Pareto frontier, and a midpoint for the upper centroid and lower centroid; and defining the statistical dividers including an upper statistical divider, a lower statistical divider, and a middle statistical divider in relation to at least one of the upper centroid, lower centroid, and midpoint.

14. The method of claim 13, wherein computing the upper centroid, the lower centroid, and the midpoint comprises:

computing the upper centroid, $C_{UPF}$, for the upper Pareto frontier;

computing the lower centroid, $C_{LPF}$, for the lower Pareto frontier;

computing the midpoint, $C_{MPF}$, between the upper centroid and lower centroid according to $C_{MPF}=(C_{UPF}+C_{LPF})/2$.

15. The method of claim 14, wherein identifying the statistical dividers comprises:

selecting a value, $\alpha$, between 0 and 0.5 which defines a spacing between the statistical dividers;

defining an upper statistical divider centroid, $C_{VH}$, as $C_{VH}=(1+2\alpha)C_{MPF}$;

defining a middle upper statistical divider centroid, $C_H$, as $C_H=(1+\alpha)C_{MPF}$;

defining a middle lower statistical divider centroid, $C_L$, as $C_L=(1-\alpha)C_{MPF}$;

defining a lower statistical divider centroid, $C_{VL}$, as $C_{VL}=(1-2\alpha)C_{MPF}$;

defining the middle statistical divider, which bisects the midpoint; and defining the upper statistical divider, a middle upper statistical divider, a middle lower statistical divider, and the lower statistical divider, which extend through the upper statistical divider centroid, the middle upper statistical divider centroid, the middle lower statistical divider centroid, and the lower statistical divider centroid, and parallel to the middle statistical divider.

16. The method of claim 15, wherein assigning the ranking comprises:

determining, for each data point in the dataset D, a relative location to the upper statistical divider, upper middle statistical divider, middle statistical divider, lower middle statistical divider, and lower statistical divider, each data point; and assigning a ranking of very high, high, middle, low, and very low to each data point according to the relative location.

17. The method of claim 11, wherein identifying the statistical dividers in the data points comprises:

applying a filter to the data points of the dataset which removes zeros and outliers to generate a filtered dataset D;

computing an upper Pareto frontier ($UPF_D$) for the filtered dataset D;

selecting a value, $\alpha$, between 0 and 0.25 which defines a spacing between the statistical dividers; and computing a plurality of lower Pareto frontiers including a very high Pareto frontier ($UPF_{VH}$), a high Pareto frontier ($UPF_H$), a middle Pareto frontier ($UPF_M$), a low Pareto frontier ($UPF_L$), and a very low Pareto frontier ($UPF_{VL}$) according to:

$$UPF_{VH}=UPF_D$$

$$UPF_H=(1-\alpha)UPF_D$$

$$UPF_M=(1-2\alpha)UPF_D$$

$$UPF_L=(1-3\alpha)UPF_D$$

$$UPF_{VL}=(1-4\alpha)UPF_D;$$

wherein the upper statistical divider is $UPF_{VH}$, the lower statistical divider is $UPF_{VL}$, the middle statistical divider is $UPF_M$, and wherein define the statistical dividers further include an upper middle statistical divider $UPF_H$ and a lower middle statistical divider $UPF_L$.

18. The method of claim 17, wherein assigning the ranking comprises:

determining, for each data point in the dataset D, a relative location to the upper statistical divider, upper middle statistical divider, middle statistical divider, lower middle statistical divider, and lower statistical divider; and assigning a ranking of very high, high, middle, low, and very low to each data point according to the relative location.

19. The method of claim 17, wherein assigning the ranking comprises:

determining, for each data point in the dataset D, which statistical divider a data point is located between from the upper statistical divider, upper middle statistical divider, middle statistical divider, lower middle statistical divider, and lower statistical divider; and assigning a ranking of very high, high, middle, low, and very low to the data point based on which statistical divider the data point is located between.

20. A computing device for analyzing alarm panels, the computing device comprising:

a processing circuit including a processor and memory, the memory storing instructions that, when executed by the processor, cause the processor to:

receive, via a communications interface communicably coupled to a plurality of alarm panels at respective buildings, a plurality of alarm events from the respective alarm panels, wherein the communications interface is configured to receive alarm events from the alarm panels, the alarm events indicating an alarm type;

classify the alarm panels according to the plurality of alarm events by:

identifying, for the alarm events, an alarm type;

determining, for the alarm panels, a number of occurrences of each alarm type;

generating, for the alarm panels, a data point for a dataset, the data point representing the number of occurrences of the alarm types for a respective alarm panel;

identifying, for the dataset, statistical dividers in the data points, the statistical dividers defining a separation of rankings for the data points within the dataset; and assigning a ranking for the alarm panels based on their respective location in relation to the statistical dividers;

construct a monitoring dashboard which includes the ranking of the alarm panels according to the classification of the alarm panels; and cause the monitoring dashboard to be rendered on a display to an end user, the monitoring dashboard.

*21. A system for analyzing alarm panels, the system comprising:*

*a communications interface communicably coupled to a plurality of alarm panels at respective buildings, the communications interface configured to receive alarm events from the alarm panels, the alarm events indicating an alarm type; and*

*a processing circuit configured to:*

*receive, via the communications interface, a plurality of alarm events from the respective alarm panels;*

*classify each of the alarm panels according to the plurality of alarm events by:*

*identifying, for the alarm events, an alarm type;*

*determining, for the alarm panels, a number of occurrences of each alarm type;*

*generating, for the alarm panels, a data point for a dataset, the data point representing the number of occurrences of the alarm types for a respective alarm panel; and*

*assign a ranking for the alarm panels based on the respective data points within the dataset;*

*construct a monitoring dashboard which includes the ranking of the alarm panels according to the classification of the alarm panels; and*

*cause the monitoring dashboard to be rendered on a display to an end user, the monitoring dashboard indicating the ranking of the alarm panels.*

*22. The system of claim 21, wherein the processing circuit is further configured to classify each of the alarm panels according to the plurality of alarm events by identifying, for the dataset, statistical dividers in the data points, the statistical dividers defining a separation of rankings for the data points within the dataset, wherein the statistical dividers are parallel and equidistant from one another.*

*23. The system of claim 21, wherein the processing circuit is further configured to classify each of the alarm panels according to the plurality of alarm events by identifying, for the dataset, statistical dividers in the data points, the statistical dividers defining a separation of rankings for the data points within the dataset, wherein identifying the statistical dividers in the data points comprises:*

*applying a filter to the data points of the dataset which removes zeros and outliers;*

*computing an upper Pareto frontier within the dataset;*

*computing a lower Pareto frontier within the dataset;*

*computing an upper centroid for the upper Pareto frontier, a lower centroid for the lower Pareto frontier, and a midpoint for the upper centroid and lower centroid; and*

*defining the statistical dividers including an upper statistical divider, a lower statistical divider, and a middle statistical divider in relation to at least one of the upper centroid, lower centroid, and midpoint.*

*24. The system of claim 23, wherein computing the upper centroid, the lower centroid, and the midpoint comprises:*

*computing the upper centroid, $C_{UPF}$, for the upper Pareto frontier;*

*computing the lower centroid, $C_{LPF}$, for the lower Pareto frontier;*

*computing the midpoint, $C_{MPF}$, between the upper centroid and lower centroid according to $C_{MPF}=(C_{UPF}+C_{LPF})/2$.*

*25. The system of claim 24, wherein identifying the statistical dividers comprises:*

*selecting a value, $\alpha$, between 0 and 0.5 which defines a spacing between the statistical dividers;*

*defining an upper statistical divider centroid, $C_{VH}$, as $C_{VH}=(1+2\alpha)C_{MPF}$;*

*defining a lower statistical divider centroid, $C_{VL}$, as $C_{VL}=(1-2\alpha)C_{MPF}$;*

*defining the middle statistical divider, which bisects the midpoint;*

*defining the upper statistical divider and lower statistical divider as extending through the upper statistical divider centroid and lower statistical centroid and extending parallel to the middle statistical divider.*

*26. The system of claim 25, wherein identifying the statistical dividers further comprises:*

*defining a middle upper statistical divider centroid, $C_H$, as $C_H=(1+\alpha)C_{MPF}$; and*

*defining a middle lower statistical divider centroid, $C_L$, as $C_L=(1-\alpha)C_{MPF}$.*

*27. The system of claim 26, wherein assigning the ranking comprises:*

*determining, for each data point in the dataset D, a relative location to the upper statistical divider, upper middle statistical divider, middle statistical divider, lower middle statistical divider, and lower statistical divider; and separator*

*assigning a ranking of very high, high, middle, low, and very low to each data point according to the relative location.*

*28. The system of claim 21, wherein the processing circuit is further configured to classify each of the alarm panels according to the plurality of alarm events by identifying, for the dataset, statistical dividers in the data points, the statistical dividers defining a separation of rankings for the data points within the dataset, wherein identifying the statistical dividers in the data points comprises:*

*applying a filter to the data points of the dataset which removes zeros and outliers to generate a filtered dataset D;*

*computing an upper Pareto frontier ($UPF_D$) for the filtered dataset D;*

*selecting a value, $\alpha$, between 0 and 0.25 which defines a spacing between the statistical dividers; and*

*computing a plurality of lower Pareto frontiers including a very high Pareto frontier ($UPF_{VH}$), a high Pareto frontier ($UPF_H$), a middle Pareto frontier ($UPF_M$), a low Pareto frontier ($UPF_L$), and a very low Pareto frontier ($UPF_{VL}$) according to:*

$UPF_{VH}=UPF_D$ $UPF_H=(1-\alpha)UPF_D$ $UPF_M=(1-2\alpha)UPF_D$ $UPF_L=(1-3\alpha)UPF_D$ $UPF_{VL}=(1-4\alpha)UPF_D$;

*wherein the upper statistical divider is $UPF_{VH}$, the lower statistical divider is $UPF_{VL}$, the middle statistical divider is $UPF_M$, and wherein define the statistical dividers further include an upper middle statistical divider $UPF_H$ and a lower middle statistical divider $UPF_L$.*

*29. The system of claim 28, wherein assigning the ranking comprises:*

*determining, for each data point in the dataset D, a relative location to the upper statistical divider, upper middle statistical divider, middle statistical divider, lower middle statistical divider, and lower statistical divider; and*

*assigning a ranking of very high, high, middle, low, and very low to each data point according to the relative location.*

*30. The system of claim 28, wherein assigning the ranking comprises:*

*determining, for each data point in the dataset D, which statistical divider a data point is located between from the upper statistical divider, upper middle statistical divider, middle statistical divider, lower middle statistical divider, and lower statistical divider; and*

*assigning a ranking of very high, high, middle, low, and very low to the data point based on which statistical divider the data point is located between.*

*31. A method for analyzing alarm panels, the system comprising:*

*receiving, via a communications interface communicably coupled to a plurality of alarm panels at respective buildings, a plurality of alarm events from the respective alarm panels, wherein the communications interface is configured to receive alarm events from the alarm panels, the alarm events indicating an alarm type;*

*classifying the alarm panels according to the plurality of alarm events by:*

*identifying, for the alarm events, an alarm type;*

*determining, for the alarm panels, a number of occurrences of each alarm type;*

*generating, for the alarm panels, a data point for a dataset, the data point representing the number of occurrences of the alarm types for a respective alarm panel; and*

*assigning a ranking for the alarm panels based on the respective data points within the dataset;*

*constructing a monitoring dashboard which includes the ranking of the alarm panels according to the classification of the alarm panels; and*

*causing the monitoring dashboard to be rendered on a display to an end user, the monitoring dashboard indicating the ranking of the alarm panels.*

*32. The method of claim 31, wherein classifying the alarm panels according to the plurality of alarm events further comprises identifying, for the dataset, statistical dividers in the data points, the statistical dividers defining a separation of rankings for the data points within the dataset, wherein the statistical dividers are parallel and equidistant from one another.*

*33. The method of claim 31, wherein classifying the alarm panels according to the plurality of alarm events further comprises identifying, for the dataset, statistical dividers in the data points, the statistical dividers defining a separation of rankings for the data points within the dataset, wherein identifying the statistical dividers in the data points comprises:*

*applying a filter to the data points of the dataset which removes zeros and outliers;*

*computing an upper Pareto frontier within the dataset;*

*computing a lower Pareto frontier within the dataset;*

*computing an upper centroid for the upper Pareto frontier, a lower centroid for the lower Pareto frontier, and a midpoint for the upper centroid and lower centroid; and*

*defining the statistical dividers including an upper statistical divider, a lower statistical divider, and a middle statistical divider in relation to at least one of the upper centroid, lower centroid, and midpoint.*

*34. The method of claim 33, wherein computing the upper centroid, the lower centroid, and the midpoint comprises:*

*computing the upper centroid, $C_{UPF}$, for the upper Pareto frontier;*

*computing the lower centroid, $C_{LPF}$, for the lower Pareto frontier;*

*computing the midpoint, $C_{MPF}$, between the upper centroid and lower centroid according to $C_{MPF}=(C_{UPF}+C_{LPF})/2$.*

*35. The method of claim 34, wherein identifying the statistical dividers comprises:*

*selecting a value, $\alpha$, between 0 and 0.5 which defines a spacing between the statistical dividers;*

*defining an upper statistical divider centroid, $C_{VH}$, as $C_{VH}=(1+2\alpha)C_{MPF}$;*

*defining a middle upper statistical divider centroid, $C_H$, as $C_H=(1+\alpha)C_{MPF}$;*

*defining a middle lower statistical divider centroid, $C_L$, as $C_L=(1-\alpha)C_{MPF}$;*

*defining a lower statistical divider centroid, $C_{VL}$, as $C_{VL}=(1-2\alpha)C_{MPF}$;*

*defining the middle statistical divider, which bisects the midpoint; and*

*defining the upper statistical divider, a middle upper statistical divider, a middle lower statistical divider, and the lower statistical divider, which extend through the upper statistical divider centroid, the middle upper statistical divider centroid, the middle lower statistical divider centroid, and the lower statistical divider centroid, and parallel to the middle statistical divider.*

*36. The method of claim 35, wherein assigning the ranking comprises:*

*determining, for each data point in the dataset D, a relative location to the upper statistical divider, upper middle statistical divider, middle statistical divider, lower middle statistical divider, and lower statistical divider, each data point; and*

*assigning a ranking of very high, high, middle, low, and very low to each data point according to the relative location.*

*37. The method of claim 31, wherein classifying the alarm panels according to the plurality of alarm events further comprises identifying, for the dataset, statistical dividers in the data points, the statistical dividers defining a separation of rankings for the data points within the dataset, wherein identifying the statistical dividers in the data points comprises:*

*applying a filter to the data points of the dataset which removes zeros and outliers to generate a filtered dataset D;*

*computing an upper Pareto frontier ($UPF_D$) for the filtered dataset D;*

*selecting a value, α, between 0 and 0.25 which defines a spacing between the statistical dividers; and*

*computing a plurality of lower Pareto frontiers including a very high Pareto frontier ($UPF_{VH}$), a high Pareto frontier ($UPF_H$), a middle Pareto frontier ($UPF_M$), a low Pareto frontier ($UPF_L$), and a very low Pareto frontier ($UPF_{VL}$) according to:*

$$UPF_{VH}=UPF_D$$

$$UPF_H=(1-\alpha)UPF_D$$

$$UPF_M=(1-2\alpha)UPF_D$$

$$UPF_L=(1-3\alpha)UPF_D$$

$$UPF_{VL}=(1-4\alpha)UPF_D;$$

*wherein the upper statistical divider is $UPF_{VH}$, the lower statistical divider is $UPF_{VL}$, the middle statistical divider is $UPF_M$, and wherein define the statistical dividers further include an upper middle statistical divider $UPF_H$ and a lower middle statistical divider $UPF_L$.*

*38. The method of claim 37, wherein assigning the ranking comprises:*

*determining, for each data point in the dataset D, a relative location to the upper statistical divider, upper middle statistical divider, middle statistical divider, lower middle statistical divider, and lower statistical divider; and*

*assigning a ranking of very high, high, middle, low, and very low to each data point according to the relative location.*

*39. The method of claim 37, wherein assigning the ranking comprises:*

*determining, for each data point in the dataset D, which statistical divider a data point is located between from the upper statistical divider, upper middle statistical divider, middle statistical divider, lower middle statistical divider, and lower statistical divider; and*

*assigning a ranking of very high, high, middle, low, and very low to the data point based on which statistical divider the data point is located between.*

*40. A computing device for analyzing alarm panels, the computing device comprising:*

*a processing circuit including a processor and memory, the memory storing instructions that, when executed by the processor, cause the processor to:*

*receive, via a communications interface communicably coupled to a plurality of alarm panels at respective buildings, a plurality of alarm events from the respective alarm panels, wherein the communications interface is configured to receive alarm events from the alarm panels, the alarm events indicating an alarm type;*

*classify the alarm panels according to the plurality of alarm events by:*

*identifying, for the alarm events, an alarm type;*

*determining, for the alarm panels, a number of occurrences of each alarm type;*

*generating, for the alarm panels, a data point for a dataset, the data point representing the number of occurrences of the alarm types for a respective alarm panel; and*

*assigning a ranking for the alarm panels based on the respective data points within the dataset;*

*construct a monitoring dashboard which includes the ranking of the alarm panels according to the classification of the alarm panels; and*

*cause the monitoring dashboard to be rendered on a display to an end user, the monitoring dashboard.*

* * * * *